United States Patent
Case et al.

(10) Patent No.: US 9,174,781 B2
(45) Date of Patent: Nov. 3, 2015

(54) TIE WRAP FOR BUNDLING OBJECTS

(75) Inventors: Richard N. Case, Boulder, CO (US); Bowden Ormsbee, Longmont, CO (US)

(73) Assignee: Nite Ize, Inc., Boulder, CO (US)

( * ) Notice: Subject to any disclaimer, the term of this patent is extended or adjusted under 35 U.S.C. 154(b) by 271 days.

(21) Appl. No.: 13/563,562

(22) Filed: Jul. 31, 2012

(65) Prior Publication Data

US 2013/0026316 A1    Jan. 31, 2013

Related U.S. Application Data

(63) Continuation-in-part of application No. 13/196,725, filed on Aug. 2, 2011, now Pat. No. 8,806,723, which is a continuation-in-part of application No. 12/247,523, filed on Oct. 8, 2008, now Pat. No. 8,387,216.

(51) Int. Cl.
*B65D 63/00* (2006.01)
*B62J 11/00* (2006.01)

(52) U.S. Cl.
CPC *B65D 63/00* (2013.01); *B62J 11/00* (2013.01)

(58) Field of Classification Search
CPC .................................. B62J 11/00; B65D 63/00
USPC ............................. 248/62, 74.1, 230.1, 230.6
See application file for complete search history.

(56) References Cited

U.S. PATENT DOCUMENTS

| | | |
|---|---|---|
| 757,820 A | 4/1904 | Lykke |
| 1,251,778 A | 1/1918 | Humble |
| 1,407,406 A | 2/1922 | Glazebrook |
| 1,894,906 A * | 1/1933 | Henry, Jr. .................. 40/641 |
| 2,118,875 A | 5/1938 | Windheim |
| 2,175,036 A * | 10/1939 | Sipe ............................. 174/84 S |
| 2,224,972 A * | 12/1940 | Long, Jr. et al. ................. 24/3.6 |
| 2,307,808 A * | 1/1943 | Segal ........................... 24/600.6 |
| 2,377,688 A * | 6/1945 | Hubbell ............................ 63/20 |
| 2,530,695 A | 11/1950 | Helmert |
| 2,542,601 A | 2/1951 | Van Cleef |
| D165,253 S | 11/1951 | Ward |
| 2,581,825 A * | 1/1952 | Ah You ............................ 24/3.6 |
| 3,023,483 A * | 3/1962 | Steiner .......................... 428/394 |

(Continued)

FOREIGN PATENT DOCUMENTS

KR    100988204 B1    10/2010

OTHER PUBLICATIONS

ACOR, ACOR present Volara 4E, Mar. 2, 2008; http://acor.com/volara.htm.
In the US Patent and Trademark Office U.S. Appl. No. 12/247,523 Final Office Action dated Aug. 16, 2012, 11 pages.

(Continued)

*Primary Examiner* — Robert J Sandy
*Assistant Examiner* — Louis Mercado
(74) *Attorney, Agent, or Firm* — Haynes and Boone, LLP

(57) ABSTRACT

A holder includes a body, the body having a first and second receiver and a first and second cylindrical holder. The holder further includes a tie that is an elongated piece of shape-retaining deformable material and a cover covering the shape-retaining deformable material along the length of the elongated piece. The covering and the shape-retaining deformable material are bonded along their length. A first portion of the tie passes through the first cylindrical holder. A second portion of the tie passes through the second cylindrical holder, such that a loop is formed between the body and the tie, stretching from the first cylindrical holder to the second cylindrical holder.

15 Claims, 22 Drawing Sheets

(56) References Cited

U.S. PATENT DOCUMENTS

| | | | |
|---|---|---|---|
| 3,214,309 A | 10/1965 | Di Leo et al. | |
| 3,257,054 A | 6/1966 | Miesel | |
| 3,426,393 A | 2/1969 | Mead | |
| 3,458,862 A * | 7/1969 | Franks | 343/786 |
| 3,543,353 A | 12/1970 | Meehan | |
| 3,564,667 A | 2/1971 | Parrick, III et al. | |
| 3,757,429 A | 9/1973 | Sumino | |
| 3,768,711 A | 10/1973 | Wilkinson | |
| 3,806,358 A | 4/1974 | Glander et al. | |
| 3,906,139 A * | 9/1975 | Hiraoka et al. | 428/383 |
| 3,917,387 A * | 11/1975 | Ensing | 351/123 |
| 3,930,288 A | 1/1976 | Black et al. | |
| 3,947,927 A | 4/1976 | Rosenthal | |
| 3,960,302 A | 6/1976 | Mazzoni, Jr. | |
| 3,997,945 A | 12/1976 | Robins | |
| 4,015,762 A | 4/1977 | Mendillo | |
| 4,120,437 A | 10/1978 | Hara | |
| D250,631 S | 12/1978 | Stephenson | |
| 4,267,768 A * | 5/1981 | Cieslak et al. | 493/203 |
| 4,463,885 A | 8/1984 | Ball et al. | |
| 4,483,470 A | 11/1984 | Cousins | |
| 4,484,378 A | 11/1984 | Kimura et al. | |
| 4,488,748 A | 12/1984 | Burkes | |
| 4,524,937 A * | 6/1985 | Zizan | 248/74.3 |
| 4,531,661 A | 7/1985 | Santy | |
| D280,180 S | 8/1985 | Burt | |
| 4,540,006 A | 9/1985 | Collis | |
| 4,553,779 A | 11/1985 | Shortridge | |
| 4,641,454 A | 2/1987 | Ray et al. | |
| 4,648,414 A | 3/1987 | Fox et al. | |
| 4,666,417 A | 5/1987 | Hillman | |
| 4,679,387 A * | 7/1987 | Weidenhaupt et al. | 57/212 |
| 4,699,303 A | 10/1987 | Kline | |
| 4,753,355 A | 6/1988 | Hall et al. | |
| 4,761,053 A | 8/1988 | Cogelia et al. | |
| 4,817,837 A | 4/1989 | Grover | |
| 4,834,118 A | 5/1989 | Goeller | |
| 4,856,689 A | 8/1989 | Shore | |
| 4,867,478 A | 9/1989 | Anderson | |
| D304,270 S | 10/1989 | Goldman | |
| 4,915,996 A | 4/1990 | Curry | |
| D308,205 S | 5/1990 | Tholberg | |
| 4,943,016 A * | 7/1990 | Hennecke | 248/59 |
| D310,909 S | 10/1990 | Bradtl | |
| D317,611 S | 6/1991 | Poe | |
| 5,054,299 A | 10/1991 | Maveety | |
| 5,056,820 A | 10/1991 | Des Prez | |
| D323,826 S | 2/1992 | Suzuki et al. | |
| 5,104,017 A | 4/1992 | Vandagriff | |
| 5,154,964 A * | 10/1992 | Iwai et al. | 428/156 |
| 5,178,354 A * | 1/1993 | Engvall | 248/316.7 |
| 5,190,336 A | 3/1993 | Palz | |
| 5,199,135 A | 4/1993 | Gold | |
| 5,234,370 A | 8/1993 | Shapero et al. | |
| 5,310,376 A | 5/1994 | Mayuzumi et al. | |
| 5,342,687 A * | 8/1994 | Iwai et al. | 428/402 |
| D354,620 S | 1/1995 | King et al. | |
| 5,390,884 A * | 2/1995 | Skoff et al. | 248/156 |
| 5,437,401 A | 8/1995 | Seltzer | |
| 5,468,036 A | 11/1995 | Brown | |
| 5,498,190 A | 3/1996 | Ganson | |
| D372,358 S | 8/1996 | Mathison | |
| 5,590,422 A | 1/1997 | Henderson | |
| D377,798 S | 2/1997 | Heine | |
| 5,607,748 A * | 3/1997 | Feltman | 428/156 |
| D379,542 S | 5/1997 | Egashira | |
| 5,664,589 A | 9/1997 | Black | |
| 5,711,143 A | 1/1998 | Munakata et al. | |
| 5,714,211 A | 2/1998 | Zinbarg et al. | |
| 5,769,994 A | 6/1998 | Booz et al. | |
| 5,787,361 A | 7/1998 | Chen | |
| 5,788,134 A * | 8/1998 | Matic, Jr. | 224/414 |
| D399,021 S | 9/1998 | Lam | |
| 5,827,461 A * | 10/1998 | Feltman | 264/177.1 |
| 5,833,188 A * | 11/1998 | Studdiford et al. | 248/229.17 |
| 5,853,212 A | 12/1998 | Daniel | |
| 5,864,924 A * | 2/1999 | Rodriguez | 24/3.3 |
| 5,898,975 A * | 5/1999 | Hancock | 16/114.1 |
| 5,916,006 A | 6/1999 | Ganson | |
| 5,944,080 A | 8/1999 | Podwika | |
| D425,226 S | 5/2000 | Galli | |
| D426,235 S | 6/2000 | Phirippidis et al. | |
| 6,081,695 A | 6/2000 | Wallace et al. | |
| 6,086,029 A * | 7/2000 | Oliver | 248/200.1 |
| 6,105,923 A | 8/2000 | Robertson et al. | |
| 6,113,170 A | 9/2000 | Daniel | |
| 6,114,036 A | 9/2000 | Rinehart et al. | |
| D433,642 S | 11/2000 | Bauman | |
| D438,536 S | 3/2001 | Willison et al. | |
| 6,206,187 B1 | 3/2001 | Van Winkle | |
| 6,206,542 B1 | 3/2001 | Case et al. | |
| 6,237,740 B1 | 5/2001 | Weatherall et al. | |
| 6,332,052 B1 | 12/2001 | Luther et al. | |
| D455,419 S | 4/2002 | Inoue | |
| D455,815 S | 4/2002 | Bonzer | |
| 6,364,257 B1 * | 4/2002 | Holder | 248/74.3 |
| 6,372,344 B1 | 4/2002 | Castellani et al. | |
| D465,292 S * | 11/2002 | Ko | D26/4 |
| 6,473,944 B1 | 11/2002 | Vazin | |
| 6,478,282 B1 | 11/2002 | Flemming | |
| D466,287 S | 12/2002 | Tanaka | |
| 6,527,482 B1 * | 3/2003 | Stankus | 405/259.5 |
| 6,563,927 B2 | 5/2003 | Mote et al. | |
| 6,705,497 B1 | 3/2004 | Schuett | |
| 6,742,685 B2 | 6/2004 | Williams | |
| D493,280 S | 7/2004 | Tabata | |
| 6,785,566 B1 | 8/2004 | Irizarry | |
| D499,546 S | 12/2004 | Smithers | |
| 6,848,663 B2 | 2/2005 | Olive | |
| D508,605 S | 8/2005 | Hwang et al. | |
| 7,011,879 B1 | 3/2006 | Contreras et al. | |
| D520,526 S * | 5/2006 | Wuest et al. | D15/28 |
| D523,022 S | 6/2006 | Peng | |
| D528,539 S | 9/2006 | McClaude | |
| D531,339 S | 10/2006 | Lee et al. | |
| 7,123,801 B2 | 10/2006 | Fitz | |
| D533,994 S | 12/2006 | Hussaini et al. | |
| D534,004 S | 12/2006 | Waniga | |
| D536,116 S | 1/2007 | Sharrah | |
| 7,192,069 B1 | 3/2007 | Daniel | |
| 7,250,213 B2 | 7/2007 | Duncan | |
| D565,290 S | 4/2008 | Brandenburg et al. | |
| 7,357,540 B2 | 4/2008 | Booty, Jr. | |
| 7,377,828 B2 | 5/2008 | Cheung | |
| D570,844 S | 6/2008 | Liu et al. | |
| D574,819 S | 8/2008 | Andre et al. | |
| D575,056 S | 8/2008 | Tan | |
| D579,009 S | 10/2008 | Su et al. | |
| D580,437 S | 11/2008 | Kiyomiya et al. | |
| D586,795 S | 2/2009 | Richter | |
| D587,708 S | 3/2009 | Yoshida et al. | |
| D588,735 S | 3/2009 | Woodard | |
| D591,044 S | 4/2009 | Lakhiani | |
| 7,516,575 B2 | 4/2009 | Cuccurullo | |
| D592,341 S | 5/2009 | Fan | |
| D593,750 S | 6/2009 | Song | |
| D594,224 S | 6/2009 | Leung et al. | |
| D597,298 S | 8/2009 | Lown et al. | |
| 7,571,837 B2 * | 8/2009 | Orlowski | 222/386 |
| D600,852 S | 9/2009 | Clepper et al. | |
| 7,609,512 B2 | 10/2009 | Richardson et al. | |
| D603,603 S | 11/2009 | Laine et al. | |
| D606,311 S | 12/2009 | Lown et al. | |
| D606,312 S | 12/2009 | Lown et al. | |
| D606,739 S | 12/2009 | Fahrendorff et al. | |
| 7,630,745 B2 | 12/2009 | Chen et al. | |
| D609,226 S | 2/2010 | Hofer et al. | |
| D609,460 S | 2/2010 | Riccardi | |
| D609,853 S | 2/2010 | Salatto-Rose | |
| D610,135 S | 2/2010 | Hofer et al. | |
| 7,661,620 B2 | 2/2010 | Fields | |
| 7,673,745 B2 | 3/2010 | Sirichai et al. | |
| 7,683,275 B2 | 3/2010 | Moore et al. | |
| D613,498 S | 4/2010 | Tsai | |

(56) References Cited

U.S. PATENT DOCUMENTS

| | | | |
|---|---|---|---|
| D614,402 S | 4/2010 | Lown et al. | |
| D615,078 S | 5/2010 | Bradley | |
| D616,292 S * | 5/2010 | Martinson | D8/394 |
| D616,361 S | 5/2010 | Huang | |
| D617,093 S | 6/2010 | Pedersen et al. | |
| D619,361 S | 7/2010 | Andre et al. | |
| 7,757,913 B2 | 7/2010 | Fichera | |
| D620,931 S | 8/2010 | Opman | |
| D622,429 S | 8/2010 | Jones | |
| D623,180 S | 9/2010 | Diebel | |
| D625,303 S | 10/2010 | Kim | |
| D628,534 S | 12/2010 | Daniel | |
| D628,798 S | 12/2010 | Kalbach | |
| D629,404 S | 12/2010 | Wu et al. | |
| D630,848 S | 1/2011 | Long et al. | |
| D630,936 S | 1/2011 | Carney | |
| D631,058 S | 1/2011 | Chin et al. | |
| 7,861,981 B2 * | 1/2011 | Olver | 248/68.1 |
| 7,901,148 B2 | 3/2011 | Zunker | |
| D635,555 S | 4/2011 | Giles | |
| D637,592 S | 5/2011 | Magness et al. | |
| D638,005 S | 5/2011 | Richardson et al. | |
| D638,828 S | 5/2011 | Melanson et al. | |
| D641,974 S | 7/2011 | Stampfli | |
| 7,980,435 B2 | 7/2011 | Tages | |
| D643,029 S | 8/2011 | Feng | |
| D644,168 S | 8/2011 | Bishay et al. | |
| 8,033,678 B2 | 10/2011 | Patterson | |
| D648,332 S | 11/2011 | Kim et al. | |
| D649,347 S | 11/2011 | Smith et al. | |
| D649,537 S | 11/2011 | Magness et al. | |
| D649,539 S | 11/2011 | Hong | |
| D650,371 S | 12/2011 | Wibby et al. | |
| D651,204 S | 12/2011 | Wibby et al. | |
| D652,825 S | 1/2012 | Bau | |
| D654,069 S | 2/2012 | Kwon et al. | |
| D654,914 S | 2/2012 | Martin | |
| D655,081 S | 3/2012 | Maravilla et al. | |
| D658,169 S | 4/2012 | Mo | |
| D660,857 S | 5/2012 | Emami | |
| 8,204,561 B2 | 6/2012 | Mongan et al. | |
| D662,925 S | 7/2012 | Mayberry et al. | |
| D663,263 S | 7/2012 | Gupta et al. | |
| D663,725 S | 7/2012 | Polito | |
| 8,245,842 B2 | 8/2012 | Bau | |
| 8,246,268 B1 * | 8/2012 | Dratewski | 403/227 |
| D669,062 S | 10/2012 | Rothbaum et al. | |
| D669,618 S * | 10/2012 | Ormsbee et al. | D26/62 |
| D669,619 S * | 10/2012 | Ormsbee et al. | D26/62 |
| 8,286,789 B2 | 10/2012 | Wilson et al. | |
| 8,297,440 B2 | 10/2012 | Schmidt et al. | |
| D670,279 S | 11/2012 | Veltz et al. | |
| 8,316,611 B2 | 11/2012 | Ellis et al. | |
| D672,735 S | 12/2012 | Barley et al. | |
| D672,754 S | 12/2012 | Inada | |
| D675,014 S | 1/2013 | Adelman et al. | |
| 8,356,736 B2 | 1/2013 | Musgrave | |
| D675,605 S | 2/2013 | Adelman et al. | |
| D675,606 S | 2/2013 | Adelman et al. | |
| D676,841 S | 2/2013 | Magness et al. | |
| D678,755 S | 3/2013 | Weidemann et al. | |
| 8,387,216 B1 * | 3/2013 | Martinson | 24/30.5 T |
| D679,701 S | 4/2013 | Adelman et al. | |
| 8,428,664 B1 | 4/2013 | Wyers | |
| D681,612 S | 5/2013 | Palacios | |
| D683,136 S | 5/2013 | Wilson et al. | |
| D684,358 S | 6/2013 | Pegg | |
| D685,990 S | 7/2013 | Zhang | |
| 8,478,357 B1 | 7/2013 | Harrington | |
| D690,292 S | 9/2013 | Bibla et al. | |
| 8,616,422 B2 | 12/2013 | Adelman et al. | |
| 2002/0028336 A1 | 3/2002 | Jaccoud | |
| 2002/0118535 A1 | 8/2002 | Nostrant | |
| 2003/0019894 A1 | 1/2003 | Caldana | |
| 2003/0103624 A1 | 6/2003 | Hu | |
| 2004/0089688 A1 | 5/2004 | Perez | |
| 2005/0035161 A1 | 2/2005 | Shioda | |
| 2005/0093205 A1 | 5/2005 | Martin et al. | |
| 2005/0211357 A1 | 9/2005 | Ren | |
| 2005/0274211 A1 | 12/2005 | Edgman | |
| 2005/0274425 A1 | 12/2005 | Ostrander et al. | |
| 2006/0058070 A1 | 3/2006 | Chang | |
| 2008/0096620 A1 | 4/2008 | Lee et al. | |
| 2008/0124544 A1 | 5/2008 | Alexander et al. | |
| 2008/0127460 A1 * | 6/2008 | Severen et al. | 24/3.3 |
| 2008/0223389 A1 * | 9/2008 | Harvie | 132/200 |
| 2008/0254281 A1 | 10/2008 | Chen et al. | |
| 2009/0000086 A1 | 1/2009 | Bing | |
| 2009/0045310 A1 | 2/2009 | Koesema, Jr. | |
| 2009/0095854 A1 | 4/2009 | Forbes et al. | |
| 2009/0140016 A1 | 6/2009 | Case et al. | |
| 2010/0021155 A1 | 1/2010 | Orzeck et al. | |
| 2010/0059649 A1 | 3/2010 | Buxton | |
| 2010/0115732 A1 * | 5/2010 | Honeycutt | 24/3.3 |
| 2010/0203931 A1 | 8/2010 | Hynecek et al. | |
| 2010/0224519 A1 | 9/2010 | Kao | |
| 2010/0294908 A1 | 11/2010 | Mish et al. | |
| 2011/0031287 A1 | 2/2011 | Le Gette et al. | |
| 2011/0073608 A1 | 3/2011 | Richardson et al. | |
| 2011/0228459 A1 | 9/2011 | Richardson et al. | |
| 2011/0286217 A1 * | 11/2011 | Martinson et al. | 362/253 |
| 2012/0088558 A1 | 4/2012 | Song | |
| 2012/0175474 A1 | 7/2012 | Barnard et al. | |
| 2013/0026316 A1 | 1/2013 | Case et al. | |
| 2013/0032617 A1 * | 2/2013 | Adelman et al. | 224/191 |
| 2013/0118932 A1 | 5/2013 | Green et al. | |
| 2013/0174382 A1 * | 7/2013 | Martinson | 24/27 |

OTHER PUBLICATIONS

In the US Patent and Trademark Office U.S. Appl. No. 12/247,523 Non-Final Office Action dated Jan. 31, 2012, 7 pages.
In the US Patent and Trademark Office U.S. Appl. No. 12/247,523 Non-Final Office Action dated Jul. 13, 2011, 9 pages.
International Search Report dated Dec. 9, 2011, in related PCT Application No. PCT/US2011/046304, 3 pages.
Web page illustration from web site illustrating Grip Twist lock and carry device; griptwist.com; Dakota Trading corporation, 2008.
Web page illustration from web site illustrating reusable silicone coated Sili Twists; www.wrapables.com; Wrapables, 2008.
In the US Patent and Trademark Office U.S. Appl. No. 13/196,725 Non-Final Office Action dated Dec. 3, 2013, 6 pages.
In the US Patent and Trademark Office U.S. Appl. No. 13/196,762 Non-Final Office Action dated Mar. 26, 2013, 13 pages.
In the US Patent and Trademark Office U.S. Appl. No. 13/784,455 Final Office Action dated Nov. 8, 2013, 11 pages.
In the US Patent and Trademark Office U.S. Appl. No. 13/784,455 Non-Final Office Action dated May 22, 2013, 9 pages.
In the US Patent and Trademark Office U.S. Appl. No. 13/968,181 Final Office Action dated Mar. 25, 2015, 7 pages.
In the US Patent and Trademark Office U.S. Appl. No. 13/968,181 Non-Final Office Action dated Oct. 3, 2014, 5 pages.
In the US Patent and Trademark Office U.S. Appl. No. 29/433,070 Final Office Action dated Nov. 21, 2014, 5 pages.
In the US Patent and Trademark Office U.S. Appl. No. 29/433,070 Non-Final Office Action dated Mar. 24, 2014, 7 pages.
Acor Volara 4E foam padding, <URL:http://www.acor.com/volara.htm>, retrieved from Internet on Nov. 15, 2012.
Cruzerlite Razr Maxx case review, posted on Oct. 3, 2012, <URL:http://forums.androidcentral.com/droid-razr-maxx/213784-cruzerlite-razr-maxx-case-review.html>, retrieved from Internet on Nov. 14, 2012.
International Search Report dated Oct. 18, 2012, in co-pending PCT Application No. PCT/US12/49309, 4 pages.
Nite Ize Connect Case for iPhone, Published on Aug. 17, 2012, by Nite Ize, Inc. <URL:http://www.youtube.com/watch?v=4LDiXufkDgY>, retrieved from Internet on Nov. 14, 2012.
Nite Ize Connect Mobile Mount, Posted Aug. 10, 2012, by Daniel Turk,<URL:http://www.maclife.com/article/reviews/best_case_scenario_nite_ize_connect_case_and_mobile_mount>, retrieved from Internet on Nov. 14, 2012.

* cited by examiner

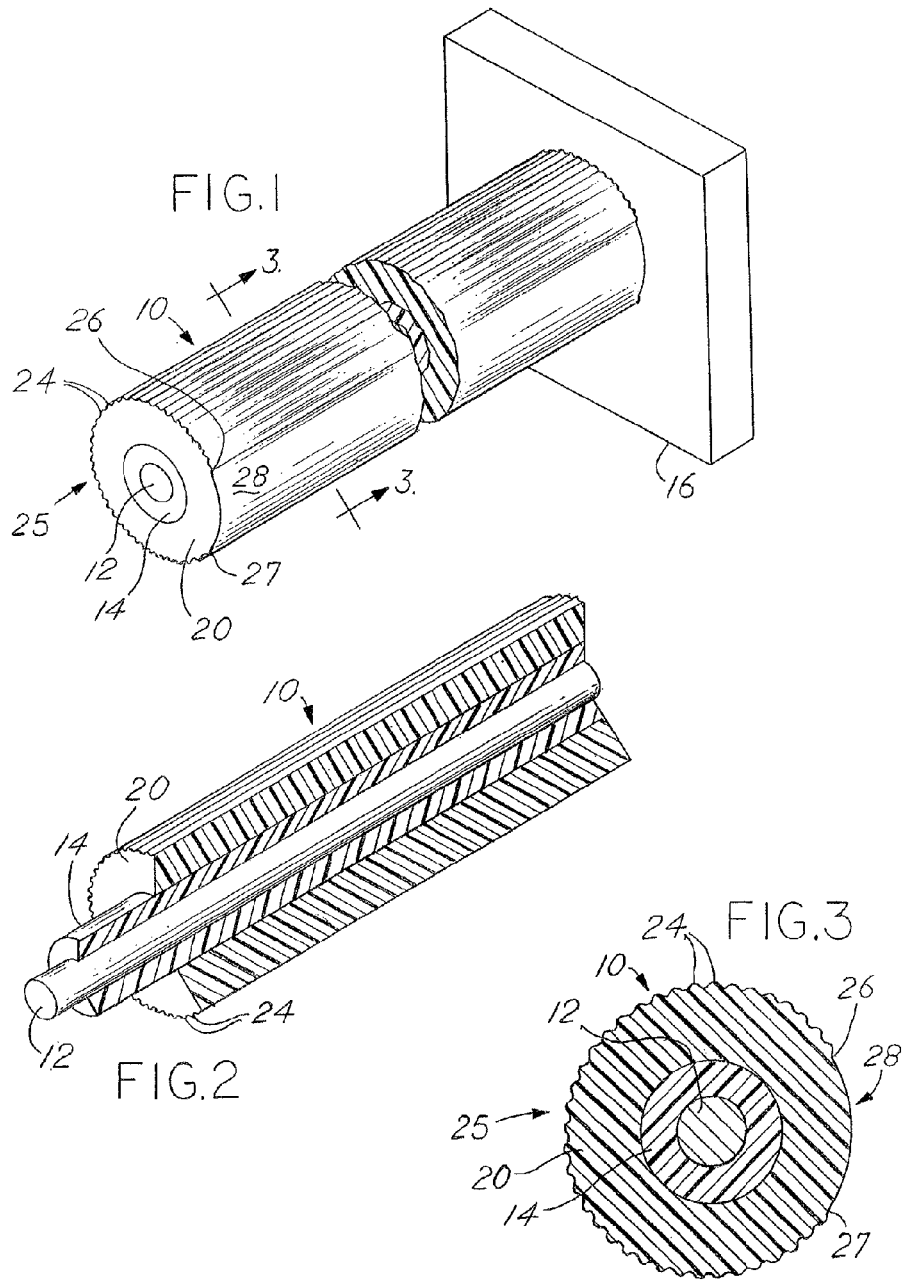

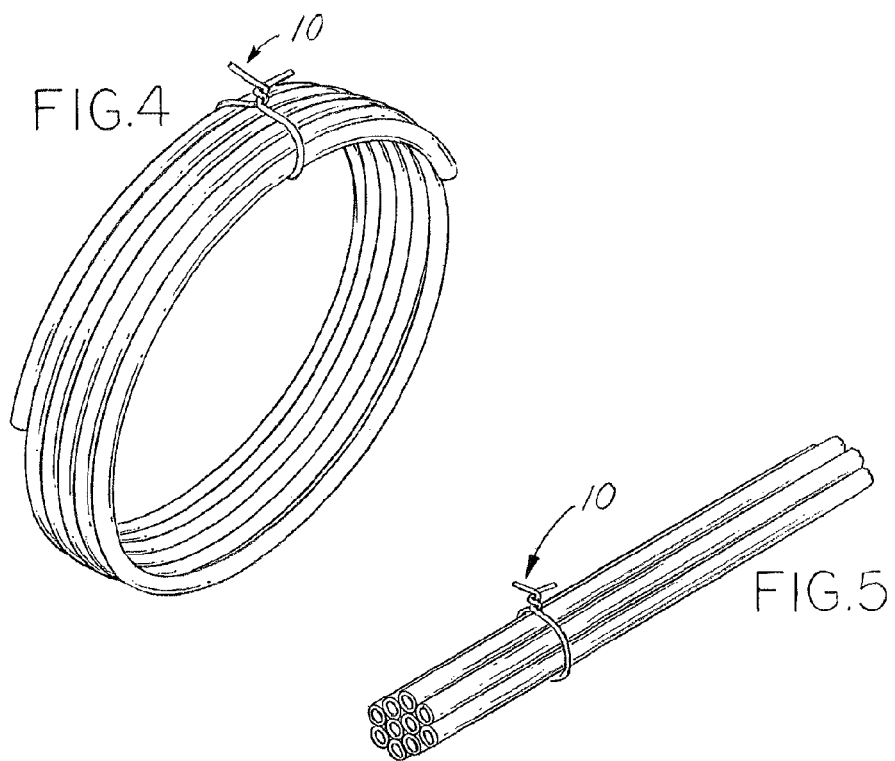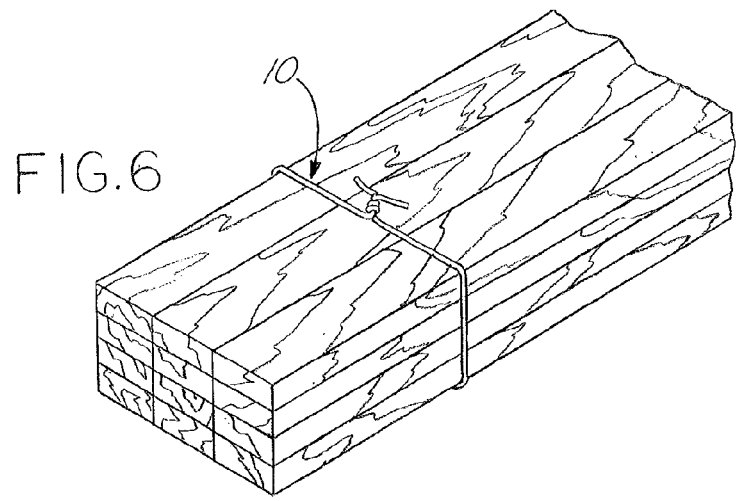

TIE WRAP FOR BUNDLING OBJECTS

CROSS REFERENCE TO RELATED APPLICATIONS

This application is a continuation-in-part of U.S. patent application Ser. No. 13/196,725 filed Aug. 2, 2011, which is a continuation-in-part of U.S. patent application Ser. No. 12/247,523 filed Oct. 8, 2008, entitled "TIE WRAP FOR BUNDLING OBJECTS." The foregoing applications are hereby incorporated by reference to the same extent as though fully disclosed herein.

BACKGROUND

Twist ties are well known in the art and typically are not suitable for supporting weight or bundling large objects. Twist ties often are found on packaging such as bread wrappers. These twist ties are usually a plastic or paper coating that covers a wire within the twist tie. The plastic or paper coating is not bonded to the wire and may be removed easily. Also, the coating provides little grip to the object on which the twist tie is wrapped. The coating does not grip itself well either.

U.S. Pat. No. 6,113,170 shows a wrap for bundling objects that includes a wire covered by a flexible tube, but there is no bonding between the wire and the tube. The invention of that patent also lacks a surface which enhances the grip of the wrap when it is wrapped around itself or other objects.

SUMMARY

Embodiments and configurations including a twist tie device are shown herein. The device has an elongated piece of shape-retaining deformable material. A cover covers the shape-retaining deformable material along the length of the elongated piece. The cover has a bond between the elongated piece and the cover. The bond between the cover and the elongated piece is along the entire interior surface of the cover. An outer cover may be bonded to the cover.

The outer cover may have a gripping surface and a non-gripping surface. The gripping surface will provide more grip for the twist tie device when it is wrapped around itself, and the gripping surface will provide more grip when it is wrapped around objects. A non-gripping surface being generally smoother than the gripping surface is suitable for containing indicia.

In one embodiment, a method of making a twist tie device includes providing an elongated piece of shape-retaining deformable material and heating the shape-retaining deformable material. The method includes coextruding a cover to surround the elongated piece of shape-retaining deformable material so that a bond is formed between the shape-retaining deformable material and the cover. The method includes injection molding an end cap beyond a length of the elongated piece of shape-retaining deformable material.

In one embodiment, a holder includes a body and a cylindrical holder interconnected with the body. The holder further includes a tie comprised of an elongated piece of shape-retaining deformable material and a cover covering the shape-retaining deformable material along the length of the elongated piece; the covering and the shape-retaining deformable material being bonded along their length; the tie located in the cylindrical holder; and the cylindrical holder having a first circular cross-section approximately equal to a second circular cross-section of the tie. Optionally, the cylindrical holder includes an aperture along a length of the cylindrical holder, the aperture more narrow than a width of the tie, such that when compressed the tie may be moved through the aperture releasing it from the cylindrical holder. Alternatively, the body includes a slot for receiving a clip. In one alternative, the body is integrated into the housing of an object. Optionally, the body includes a connection mechanism for attaching to another object. In one alternative, a plurality of cylindrical holders is attached to the body, the cylindrical holder being one of the plurality of cylindrical holders. Optionally, the body has a first and second edge; the first and second edge opposite each other and parallel to each other; the cylindrical holder located on the first edge; the cylindrical holder having a first length parallel to the first circular cross section; the first length of the cylindrical holder parallel to the first edge; a second cylindrical holder of the plurality of cylindrical holders located on the second edge; the second cylindrical holder having a third circular cross-section and a second length parallel to the third circular cross section; and the second length of the second cylindrical holder parallel to the second edge. Alternatively, the tie is located in the second cylindrical holder and a first portion of the tie stretches between the cylindrical holder and the second cylindrical holder; a second portion of the tie extends from the cylindrical holder opposite the first portion; and a third portion of the tie extends from the second cylindrical holder opposite the first portion. Optionally, the first portion of the tie is bent away from the body in order to form a support structure in conjunction with the body. In one alternative, the second and third portions of the tie are bent approximately perpendicular from the body for insertion into a gap. In another alternative, the gap is a vent of a car. Optionally, the body has a first and second side; the first and second sides are opposite each other; the cylindrical holder is located on the first side; the cylindrical holder having a first length parallel to the first circular cross section; a second cylindrical holder of the plurality of cylindrical holders located on the second side; the second cylindrical holder having a third circular cross-section and a second length parallel to the third circular cross section; and the second length of the second cylindrical holder parallel to the first length of the cylindrical holder. Alternatively, the body includes a cavity for a lighting module. Optionally, the holder further includes a cap configured to cover the cavity. Alternatively, a third side of the body opposite the cap is curved to mimic the shape of a bar. Optionally, the bar is part of a bike.

In another embodiment, an attachable lighting device includes a lighting device having a body and an aperture in the body. The attachable lighting device further includes a tie comprised of an elongated piece of shape-retaining deformable material and a cover covering the shape-retaining deformable material along the length of the elongated piece; the covering and the shape-retaining deformable material being bonded along their length; and the tie attached to the lighting device via the aperture wherein the tie is coiled around itself after passing through the aperture.

In one embodiment, a holder includes a body, the body having a first and second receiver and a first and second cylindrical holder. The holder further includes a tie comprised of an elongated piece of shape-retaining deformable material and a cover covering the shape-retaining deformable material along the length of the elongated piece. The covering and the shape-retaining deformable material are bonded along their length. A first portion of the tie passes through the first cylindrical holder. A second portion of the tie passes through the second cylindrical holder, such that a loop is formed between the body and the tie, stretching from the first cylindrical holder to the second cylindrical holder. Optionally, the first and second cylindrical holders each include an aperture along a length of the cylindrical holder with the aperture narrower than a width of the tie such that, when compressed, the tie may be moved through the aperture releasing it from the cylindrical holder. Alternately, the holder includes a second tie, a first portion of the second tie passing through a third cylindrical holder in the body, a second portion of the second tie passing through a fourth cylindrical holder in the body, such that a second loop is formed between the body and the second tie, stretching from the third cylindrical holder to the fourth cylindrical holder. Alternatively, the first receiver is configured to receive a flashlight and the first receiver is located on the body such that it is a portion of the loop formed between the body and the tie. In one configuration, the second receiver is on an opposite side of the body from the first receiver. Optionally, the second receiver is configured to receive a set of bicycle handle bars. Alternatively, a third and fourth portion of the tie are positioned on opposite the loop and are twisted to secure the second receiver to the bicycle hand bars. Optionally, the first and second receiver have a shape approximately resembling a horizontal cylinder segment, wherein horizontal refers to a direction of the length of the horizontal cylinder segment. In one alternative, the horizontal cylinder segment of the first receiver is perpendicular to the horizontal cylinder segment of the second receiver. Optionally, the covering of the tie provides for sufficient friction to effectively hold the holder to the bicycle handle bars and flashlight during normal usage.

In one embodiment, a connection device, for connecting a flashlight to another object, the connection device includes a body having a first and second receiver and a first, second, third, and fourth aperture located in the body. The connection device further includes first and second tie, the first tie passing through the first and second aperture, the second tie passing through the third and fourth aperture such that a first loop is formed on a first side of the body where the first receiver is located and a second loop is formed on the first side of the body where the first receiver is located. The first and second end of the first tie extends beyond a second side of the body where the second receiver is located and a first and second end of the second tie extends beyond the second side of the body where the second receiver is located. Optionally, wherein the first and second receiver have a shape approximately resembling a horizontal cylinder segment, wherein horizontal refers to a direction of the length of the horizontal cylinder segment. Alternatively, the horizontal cylinder segment of the first receiver is perpendicular to the horizontal cylinder segment of the second receiver. Optionally, the first receiver is configured to receive a flashlight the second receiver is configured to receive a set of bicycle handle bars. Alternatively, first and second end of the first and second tie are twisted to secure the second receiver to the bicycle hand bars. Optionally, the first and second tie are comprised of an elongated piece of shape-retaining deformable material and a cover covering the shape-retaining deformable material along the length of the elongated piece; the covering and the shape-retaining deformable material being bonded along their length.

BRIEF DESCRIPTION OF THE DRAWINGS

FIG. 1 is a perspective sectional view of the twist tie device;

FIG. 2 is a perspective sectional view of the device shown in FIG. 1;

FIG. 3 is a sectional view taken about the line 3-3 in FIG. 1;

FIGS. 4-6 show embodiments of a twist tie used to bundle various objects;

DETAILED DESCRIPTION

Figure 7:
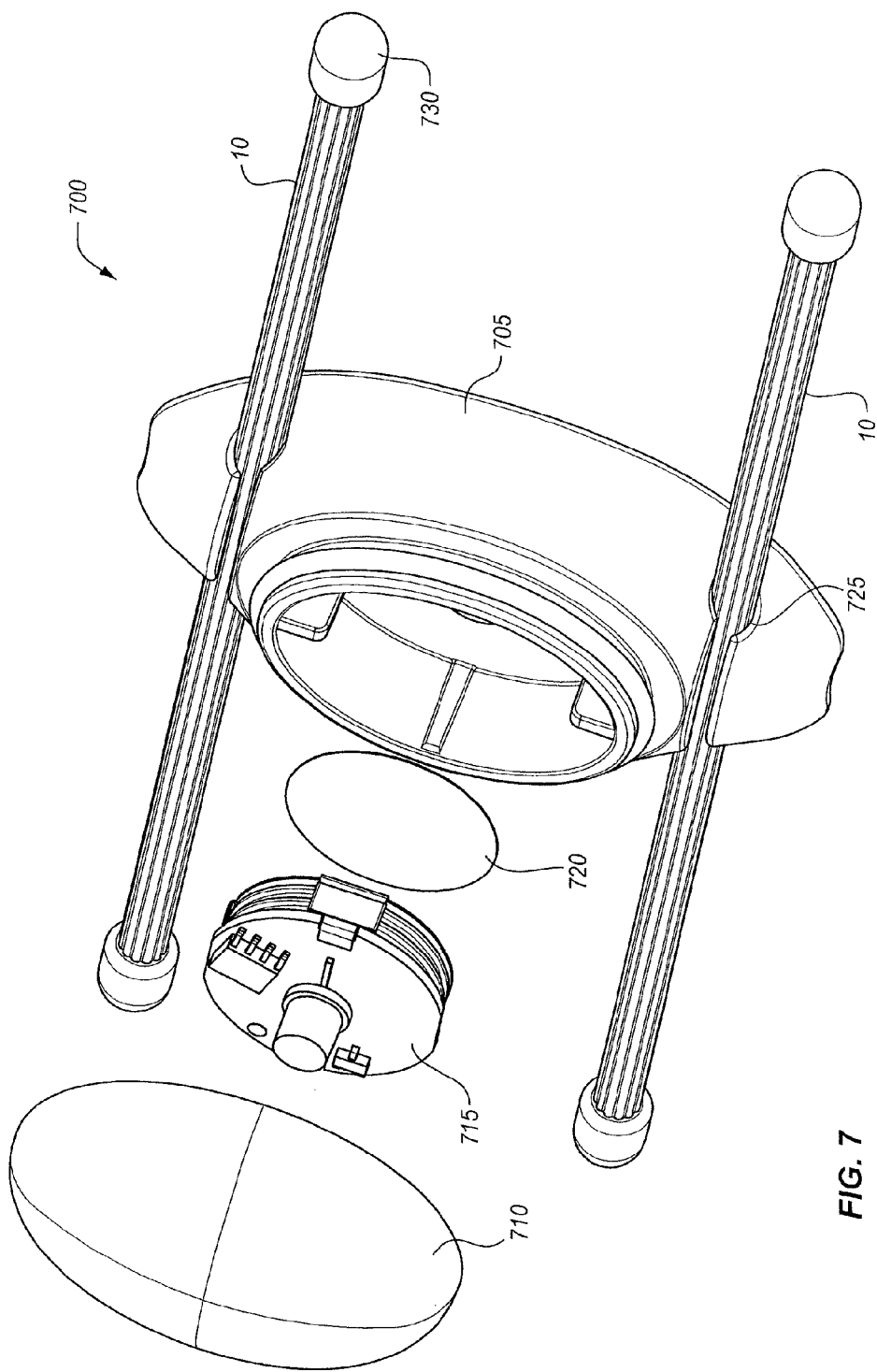
FIG. 7 shows an embodiment of a lighting device with integrated twist ties.

One embodiment of a twist tie device 10 includes an elongated piece of shape-retaining deformable material, which is typically a metal wire 12. The wire 12 is typically a mild steel wire. The wire 12 will be flexible enough to be bent or tied into a particular shape necessary to accomplish a task but still rigid enough to retain a shape into which it is bent. The diameter of the wire 12 also affects flexibility and shape retention. A diameter of 0.62 inches (smaller size ties use an 18-gauge wire; larger ties use a 16-gauge wire) provides both flexibility and necessary shape retention; however, other diameters may be used depending on the application for which the twist tie device 10 will be used. A cover 14 is bonded to the wire 12 along its entire length. The cover is formed by coextruding the wire 12 through an extrusion head 16 along with a polymer. The wire 12 first is heated to approximately 300° F. to 400° F. and then drawn through the extrusion head 16. As the wire 12 moves through the extrusion head 16, a layer of thermoplastic polymer is deposited evenly around the wire 12 to form a tie layer (cover) 14 between the wire and the outer flexible TPE cover. During this process, the polymer forming the tie layer (cover) 14 adheres to the wire 12 via a chemical in it which bonds to the wire. This forms a bond around the entire perimeter of the wire 12 and along the entire length of the wire 12. The bond prevents the wire 12 from slipping out of the cover 14. The polymer used to make the tie layer (cover) 14 is typically a solid thermoplastic polymer, such as 85 A Duro Exxon Santoprene 8291-85TL or a similar type of polymer. Santoprene is a thermoplastic vulcanizate and is particularly well suited as a cover 14 material because it is formulated to bond to metal; however, any "thermoplastic" resin can be used that has a chemical bonding agent formulated with the resin to bond to metal. Although, the bonding may not function as well, thermoplastic vulcanizate can be used. The durometer of the Santoprene cover 14 is 85 A, which is fairly tough yet flexible. An advantage of using a solid polymer such as Santoprene is that it is resilient.

In one embodiment, the twist tie device includes an internal wire. The wire has a "bonding agent polymer" on it that bonds the wire to the outer layer of TPE (thermoplastic elastomer). Putting an extremely flexible rubber on top of wire 12 without a bond would allow the rubber to slide off. During preparation, the coated wire 12 is heated to accomplish three things:

1. It helps bond the wire to the rubber quicker during the process, which allows for a more consistent part.
2. It prevents the wire from acting as a heat sink as it is pulled through the extrusion die.
3. It lubricates the wire as it goes through the die, helping to prevent surging and sticking inside the die, which makes a better, more consistent part.

Further, an end cap 750 (see FIG. 7) may be injection molded so that there is a polymer bond to the wire cover as part of the formation process. This provides for an integrated end cap 750, improving the life and usefulness of the twist tie 10. The twist tie 10 is placed in a mold to accommodate the molding of the end caps and injection molded.

An outer cover 20 can be coextruded over the cover. This outer cover 20 is typically a different material than the cover 14. The material of the outer cover 20 is typically softer and of a lower durometer. A suitable material for the outer cover 20 is 15 A Duro Teknor Apex Uniprene UN-2005 TPV. Uniprene TPV is a cross-linked elastomeric phase solid thermoplastic polymer. The lower durometer of the outer cover 20 provides a high friction surface. The generally high friction of the outer cover 20 may be increased further by extruding ribs 24 into the outer surface as shown in FIG. 3 to define a texturized gripping surface 25. Although ribs are shown, in alternative embodiments, no ribs may be used or ribs of various shapes may be used, including those that curve, weave, or are oriented in different directions. The gripping surface 25 extends between points 26 and 27 on the left side of the twist tie device 10 as shown in FIG. 3. The gripping surface 25 is well suited to provide a strong grip when the twist tie device 10 is wrapped around itself and provides friction when the device is wrapped around objects. The texturized gripping surface 25 may have other embossed patterns that provide a texturized surface; however, ribs 24 are well suited to the extrusion process by which the twist tie device 10 is made. A non-gripping surface 28 extends between points 26 and 27 on the right side of the twist tie device as shown in FIG. 3. The non-gripping surface 28 is characterized by a smoother texture than the gripping surface 25. Indicia, such as logos or other labels, may be placed on the non-gripping surface 28 and will be easier to read than if placed on the gripping surface 25. In an alternative, a 35a durometer TPE called Monprene from Teknor Apex for the larger gear ties and a 50 shore a Monprene for the smaller gear ties is used. End caps are made of the 50a durometer Monprene. If any polymer that is harder than 35a to 40a durometer for the large gear ties is used, the ties may not bend and grip properly. The material "seats" into itself more effectively when the above durometer materials are used and the ties are twisted to create a strong hold. This is not as impactful with smaller ties due to the fact that they hold lighter loads. The 15a durometer Uniprene may not have the same functional characteristics because it may be too soft for the tie and the material's tensile and tear strength is too low.

The cover 14 and outer cover 20 are bonded tightly so that no water may enter between the wire 12 and either cover 14, 20. However, the ends of the wire 12 are not protected by either cover 14, 20. The ends of the wire may be coated with a protective paint or clear coat to prevent corrosion of the ends of the wire 12, but this is not necessary. In an alternative, end caps are molded on the product.

The twist tie 10 may be used by beginning with the twist tie 10 in a generally straightened position. Articles to be bundled can be gathered into manageable bundles as shown in FIGS. 4-6. The twist tie 10 may be wrapped around each bundle of articles and then twisted to form loops around each bundle. The outer cover 20 will provide a high friction gripping surface that will prevent articles contacting the twist tie 10 from sliding out of the twist tie 10. The soft outer cover 20 will not scratch surfaces of articles within the twist tie 10. The twist tie 10 can be left in its twisted position around bundled articles for as long as necessary. The resilient cover 14 and outer cover 20 will resist taking a permanent set due to being compressed due to twisting the twist tie 10 together, or compression due to pressure exerted on the articles within the twist tie 10. Due to the durable construction of the twist tie 10, it may be used effectively in temperatures from −50° F. to 200° F. Additionally, the covers 14, 20 will prevent the twist tie 10 from breaking if the wire 12 were to break because the bond between the cover 14 and the wire 12 will prevent the wire 12 from exiting the covers 14, 20. The integration of the bonded inner and outer cover to the wire core, the outer textured surface, and the end caps provide for an extremely useful tie. Due to the bonding of the inner and outer cover to the wire core, the tie acts as a single piece of material. Therefore, when bending and twisting the tie, a firm hold is established and the slippage of the material of the tie between itself is reduced. The outer textured surface adds to the gripping function as well. The end caps provide for enhanced hold and gripping as well, as they can be inserted into various channels or holes. The ridge that is at approximately a right angle between the main body of the cord and the end cap can be used to catch against surfaces, providing an enhanced grip or hold.

FIG. 7 shows an embodiment of a lighting device with integrated twist ties 10. Lighting device 700 includes body 705, cap 710, lighting mechanism 715, and battery 720. Body 705 has two grooves 725 each for receiving a twist tie 10. Grooves 725 have a diameter that is approximately equal to the cross-sectional diameter of twist ties 10. The opening of the grooves is less than the diameter of the twist ties 10. Twist ties 10 may be inserted into grooves 725 (as shown) through a combination of compressing the rubberized coating and the body 705. In many embodiments, body 705 is some form of plastic. Optionally, some or all of body 705 may be translucent. Optionally, some or all of body 705 may be transparent. Optionally, some or all of cap 710 may be translucent. Optionally, some or all of cap 710 may be transparent. Various embodiments integrating the twist ties may be referred to as holders, receivers, attachment and attachment mechanisms, receiving attachments, etc.

Figure 8B:
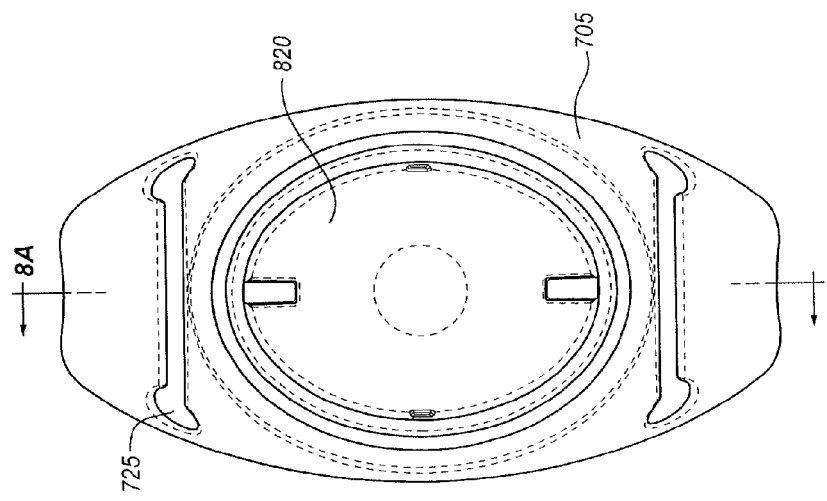
FIG. 8B shows a top view of the body of the lighting device of FIG. 7.
Figure 8A:
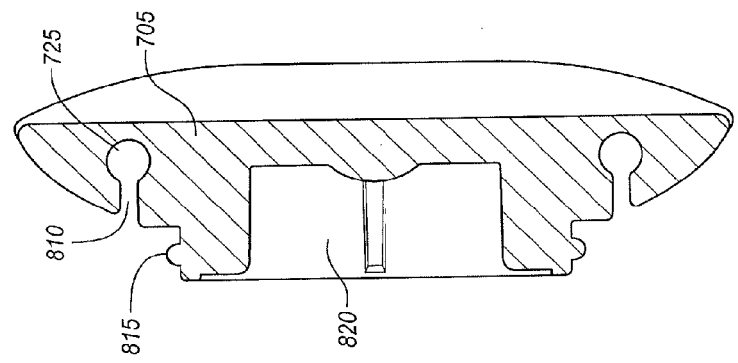
FIG. 8A shows a cross-section of the body of the lighting device of FIG. 7.

FIG. 8A shows a cross-section of the body 705. In this example, the to-scale drawing shows the relative width of the groove 725 to the opening 810. Also visible is lip 815 for the snap fit attachment of cap 710. The positioning of electronics housing 820 also is shown. FIG. 8B shows a top view and some of the same features. The dimensions of these to-scale drawings are only exemplary, and various widths and shapes may be employed. The ratio of the groove to the opening only needs to be sufficient to prevent the twist tie 10 from releasing under normal use. Another feature of the twist tie 10 is the end caps 750 that are extruded as part of the formation process such that the tie body 755 and the end caps 750 are one piece of material. This ensures sound attachment. These end caps 750 prevent the twist tie 10 from slipping out in the longitudinal direction.

Figure 9:
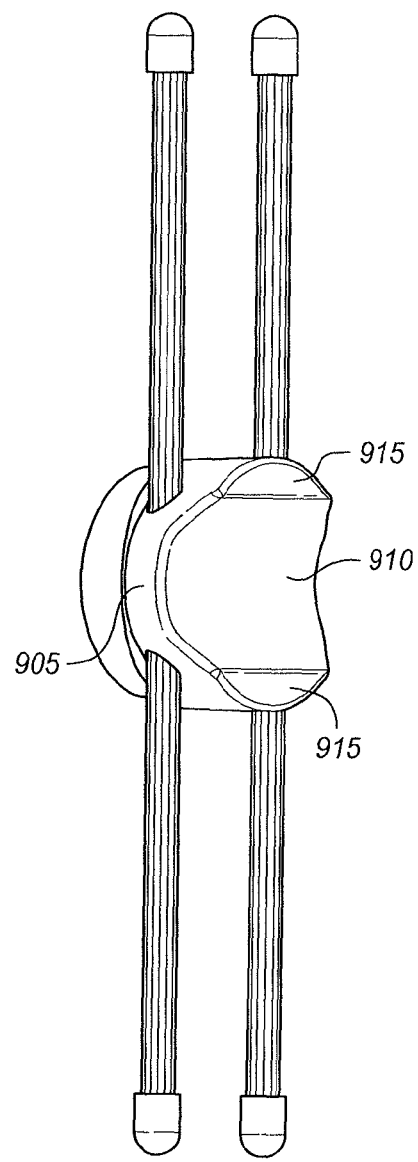
FIG. 9 shows a back view of the body of the lighting device of FIG. 7.
Figure 10:
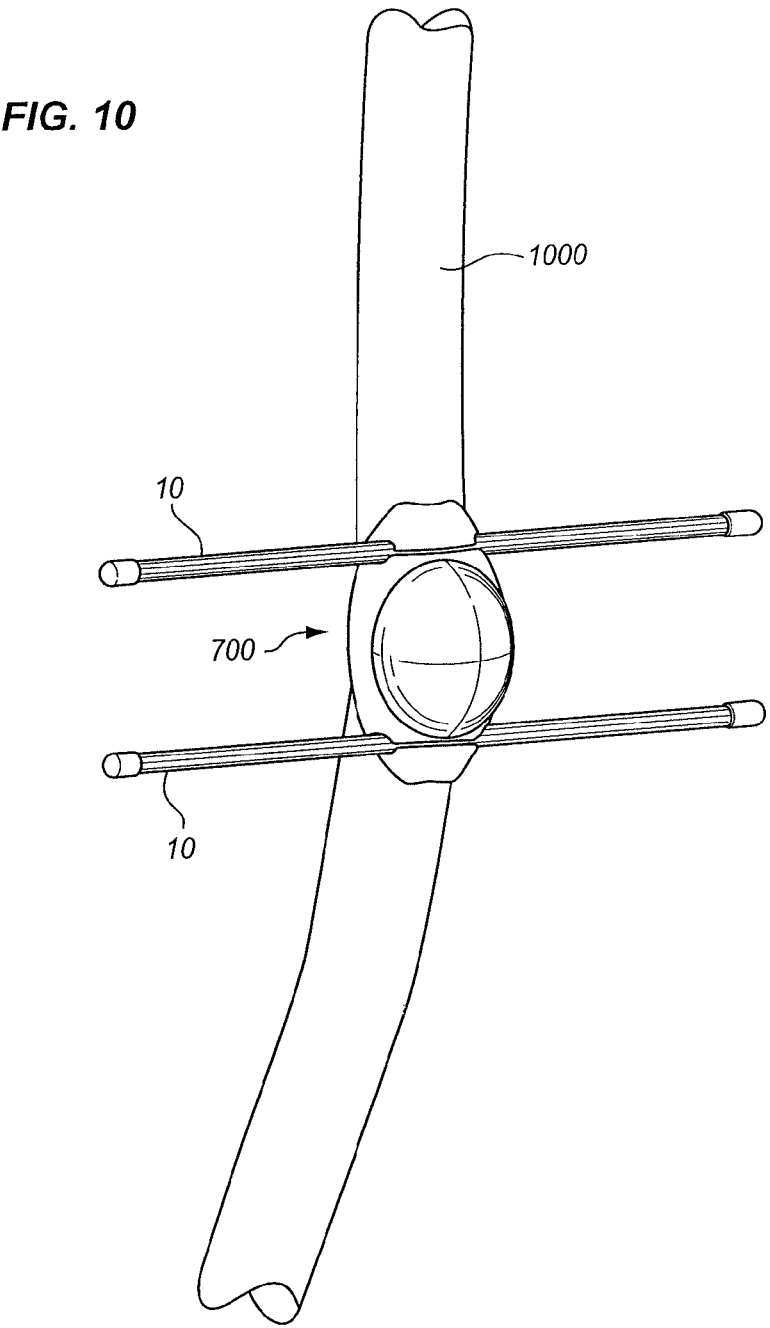
FIG. 10 shows the lighting device of FIG. 7 on a tube.

FIG. 9 shows a view of the back of body 705. Body 705 has a curved surface 910 with a lip 915 on either end. The curved surface 910 is shaped to conform to a tube-like structure. This is shown in FIG. 10 with lighting device 700 situated on a tube 1000. This configuration is designed to fit on the tubes forming the structure of a bike, scooter, or other vehicle or object having tube-like supports. After placing the lighting device on the tube 1000, the twist ties 10 are wrapped around the tube 1000 forming a secure attachment.

Figure 11:
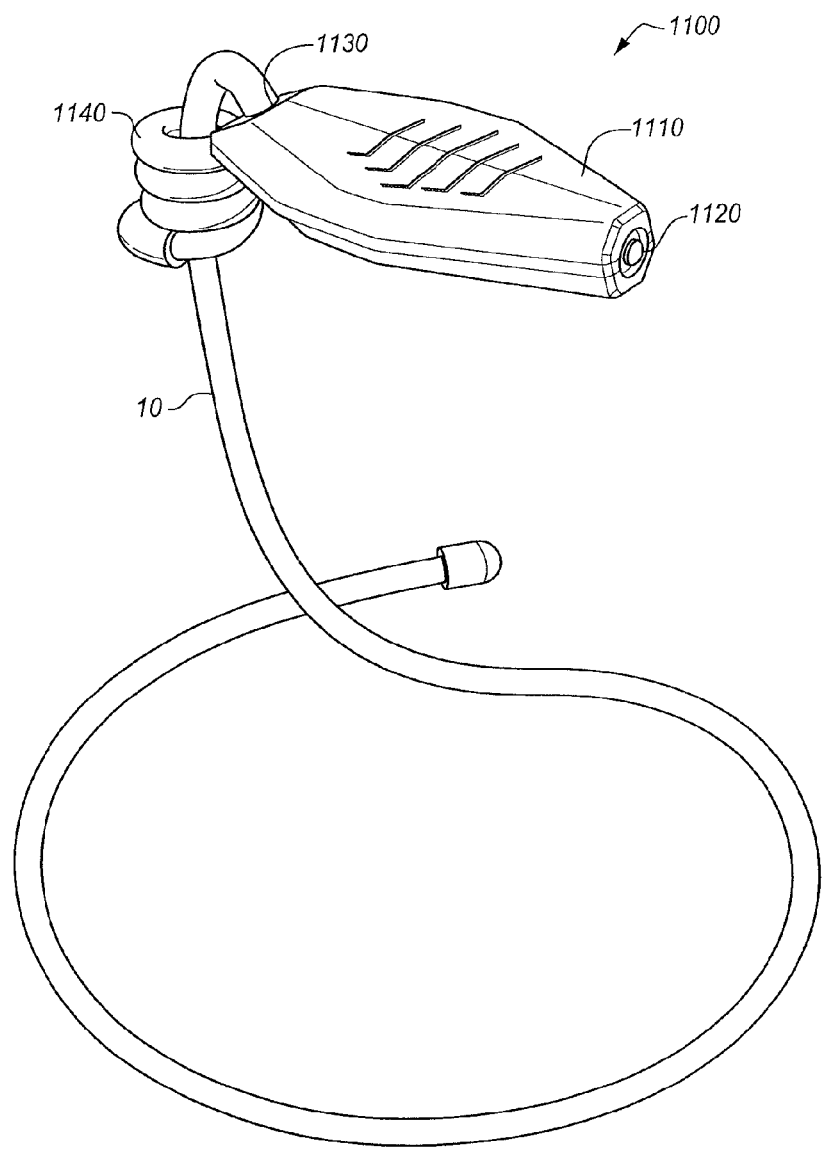
FIG. 11 shows an embodiment of the twist tie integrated with a lighting device.

FIG. 11 shows an embodiment of twist tie 10 integrated with a lighting device 1100. Lighting device 1100 generally includes a housing 1110 and a light 1120. Housing 1110 houses the electronics and power source of the light. Housing 1110 includes an aperture 1130 approximately the size and shape of a cross section of the twist tie 10 (although various sized apertures are appropriate). Twist tie 10 is passed through aperture 1130 and then coiled around itself forming coil 1140. This provides a secure connection. The loose end of twist tie 10 then may be arranged as shown to offer support to lighting device 1100. Lighting device 1100 is sufficiently light in weight, such that the rigidity of twist tie 10 may support it. The loose end of twist tie 10 may be tied around various objects and used to pose lighting device 1100 in a position convenient to the user. The frictional surface of twist tie 10 provides high friction and good hold around a variety of objects. The lighting device shown is the Inova® Microlight™; however, many different lighting devices may be substituted.

Figure 12:
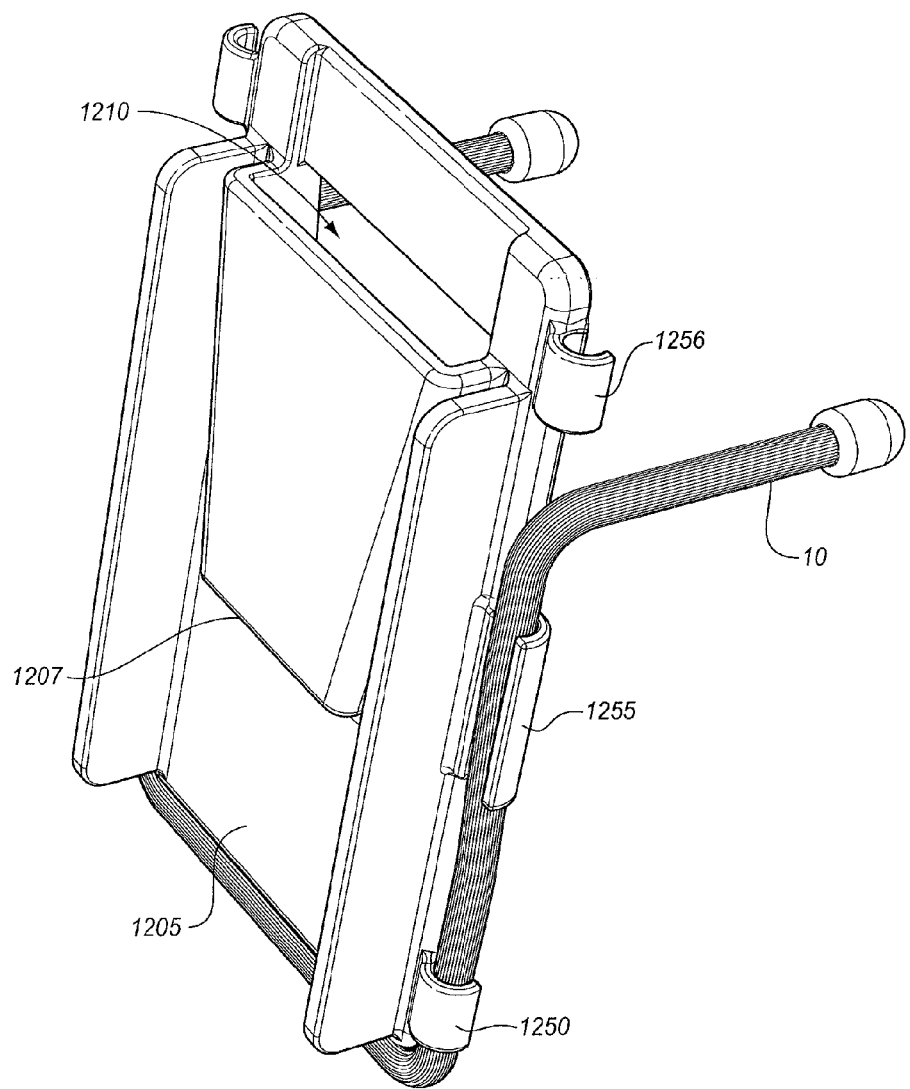
FIG. 12 shows an embodiment of a receiving attachment including twist ties for insertion into the vent of a vehicle.
Figure 13:
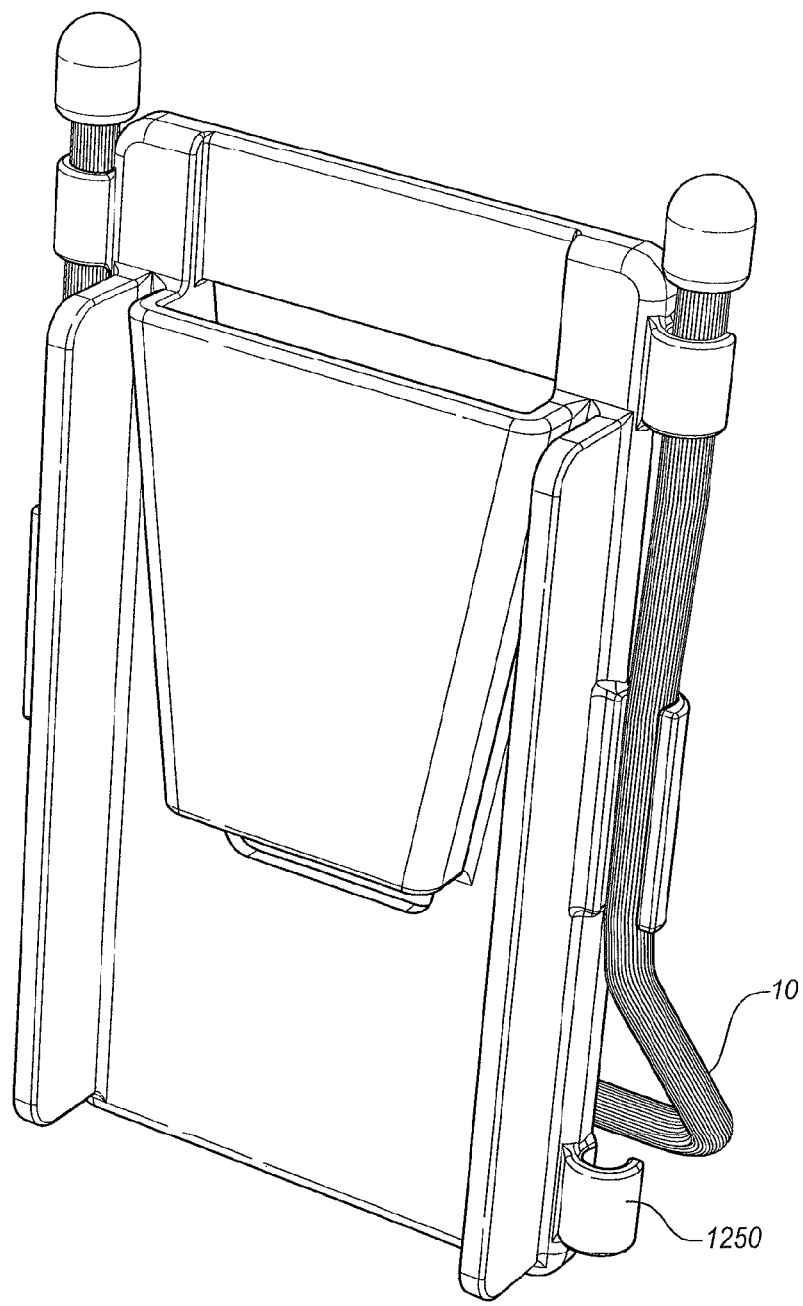
FIG. 13 shows the receiving attachment of FIG. 12 arranged as a stand.

FIG. 12 shows a receiving attachment for integrating with an object bearing a clip or other protrusion. The clip portion of a device or case may be sized to integrate into clip aperture 1210 oriented in body 1205. In some embodiments, the clip portion may include a tab at the bottom 1207 for locking a clip into clip aperture 1210. Cylindrical holders 1255, 1256 include an aperture that is less than the width of twist tie 10 such that the cylindrical holders 1255 flex and bend as does the twist tie 10 to receive twist tie 10 and hold it firmly in place. Cylindrical holders 1255, 1256 open in different directions in order to provide for ease of use and flexibility. This configuration may be advantageous in that the receiving attachment may be mounted in a car vent or other area using the configuration shown in FIG. 12. As shown in FIG. 13, by bending twist tie 10 away from bottom cylindrical holders 1256, an upright stand is formed. In the above embodiments including a twist tie, both ends of the twist tie may be bent around a bar (such as the handle bars of a bike or other object), as above with lighting device 1100. The cylindrical holders may be oriented in a variety of positions, and a variety of number of holders may be utilized. Various other receiving mechanisms may be substituted for clip aperture 1210. Cylindrical holders 1255, 1256, body 1205, and twist tie 10 may be formed to fit with a variety of objects by forming connection mechanisms on any side of the body. Cylindrical holders 1255, 1256 and 1205 may be formed as part of the housing of various objects such as cases, flashlights, electronic devices, and virtually any object having a plastic housing. Twist tie 10 then may be fitted into cylindrical holders 1255, 1256, enabling attachment to almost any object that the twist tie 10 may fit around or into. The cylindrical holders 1255, 1256 are not limited to those shown in FIGS. 10, 13, and 14; and various holders for twist tie 10 may be implemented in a variety of positions and configurations.

Figure 14:
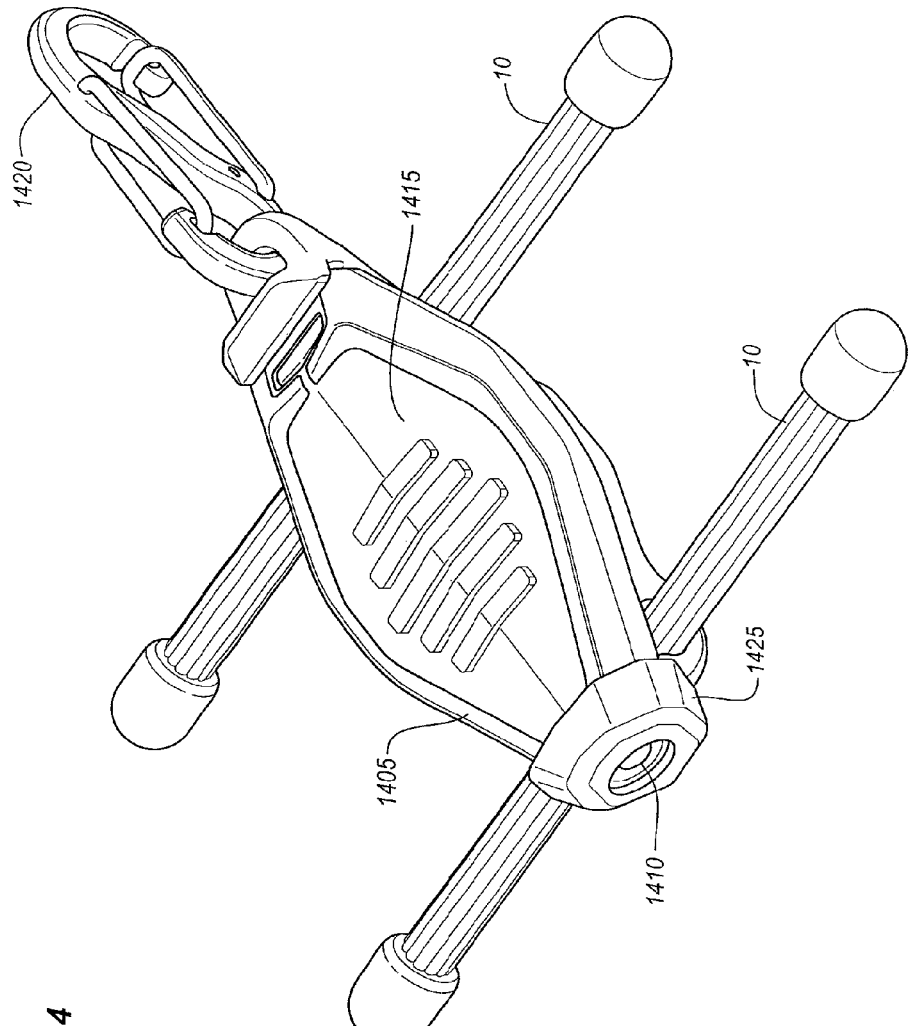
FIG. 14 shows a top perspective view of an embodiment of a lighting device incorporating ties.
Figure 15:
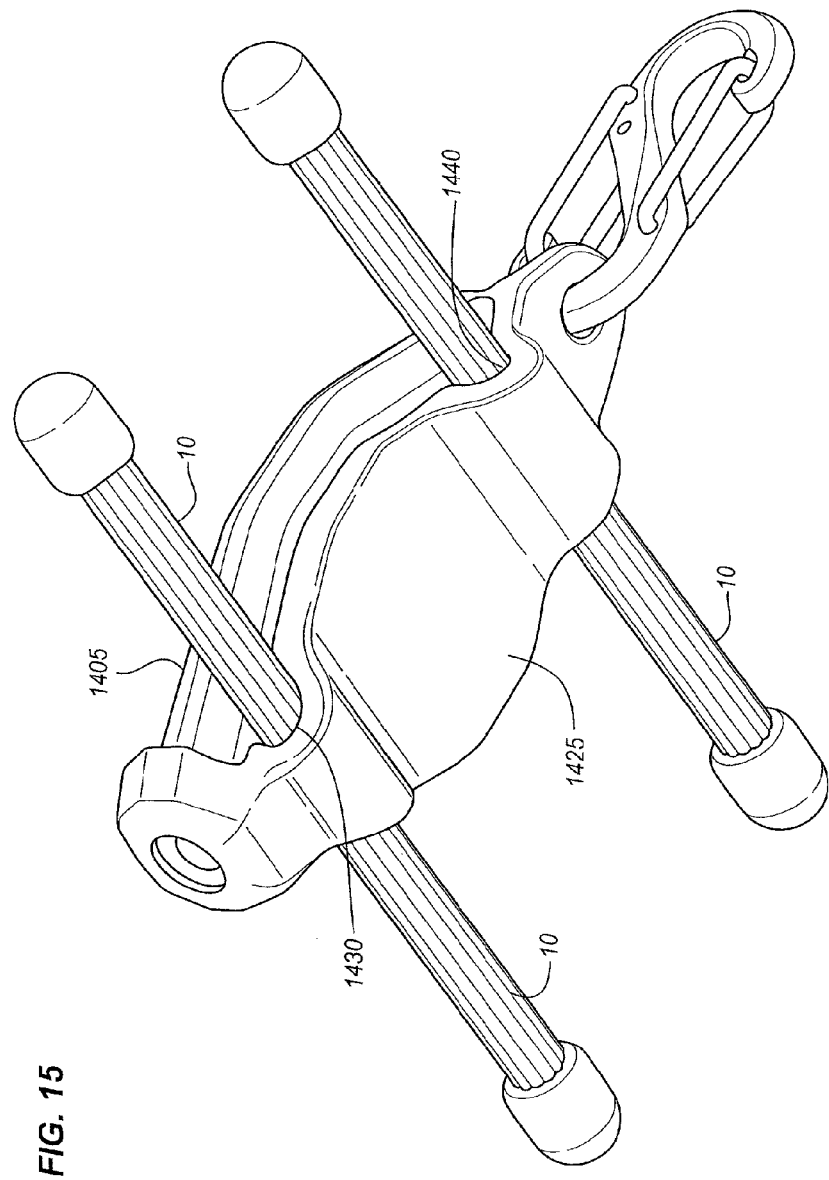
FIG. 15 shows a bottom perspective view of the lighting device of FIG. 14.
Figure 16:
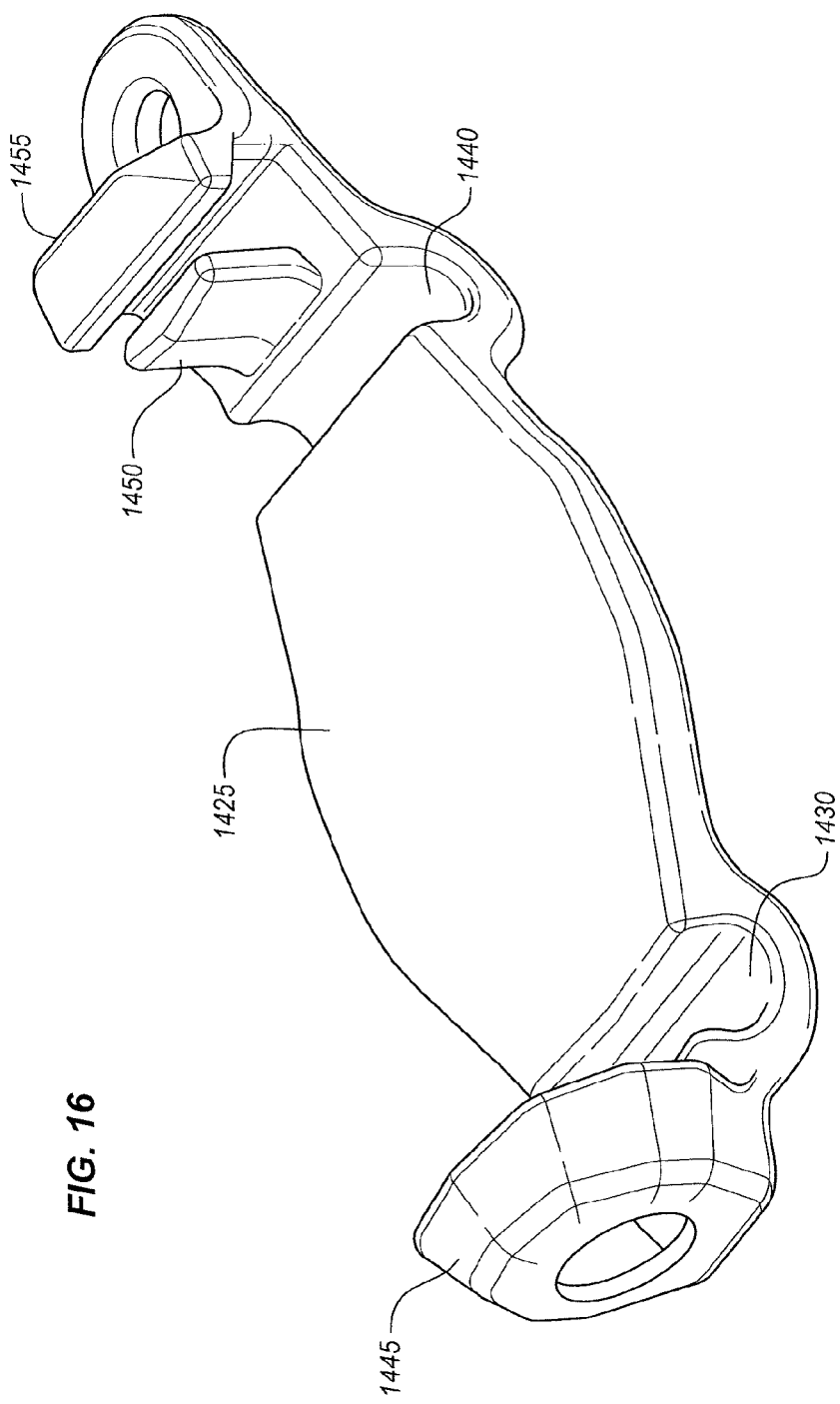
FIG. 16 shows a lower body portion of the lighting device of FIG. 14.

FIG. 14 shows yet another embodiment of an apparatus incorporating a twist tie 10. This embodiment includes a microlight, an S-Biner®, and a first and second twist tie 10. The device includes LED 1410 (which in alternatives can be a different light-providing mechanism), upper body 1405, actuator 1415, lower body portion 1425, and S-Biner® 1420. FIG. 15 is a view from the bottom of the lighting apparatus. The lower body portion 1425 that includes tie seats 1430 and 1440 is shown. FIG. 16 shows the lower body portion 1425 with the other portions removed. Clearly visible are the tie seats 1430 and 1440 which are shaped and sized to hold twist ties 10. The front upper body 1405 slides into front lower body portion 1145, and then a rear portion snaps into place by deflecting front snap fit tab 1450 and rear snap fit tab 1455. In this way, the upper body containing a lighting mechanism can be mounted on one of twist ties 10 placed into tie seats 1430 and 1440. Caps 710 prevent twist ties 10 from sliding out. Twist ties 10 may be bent to stand the apparatus upright or attach it to various objects, as well as using S-Biner® 1420 to hook the device to various objects. S-Biner® 1420 is a device having a carabineer gate on either side, although a regular carabineer or other hooking device may be substituted in alternatives. Various other body forms may be made to hold twist ties 10, those body forms including one or more seats or grooves to hold twist ties 10.

Figure 17:
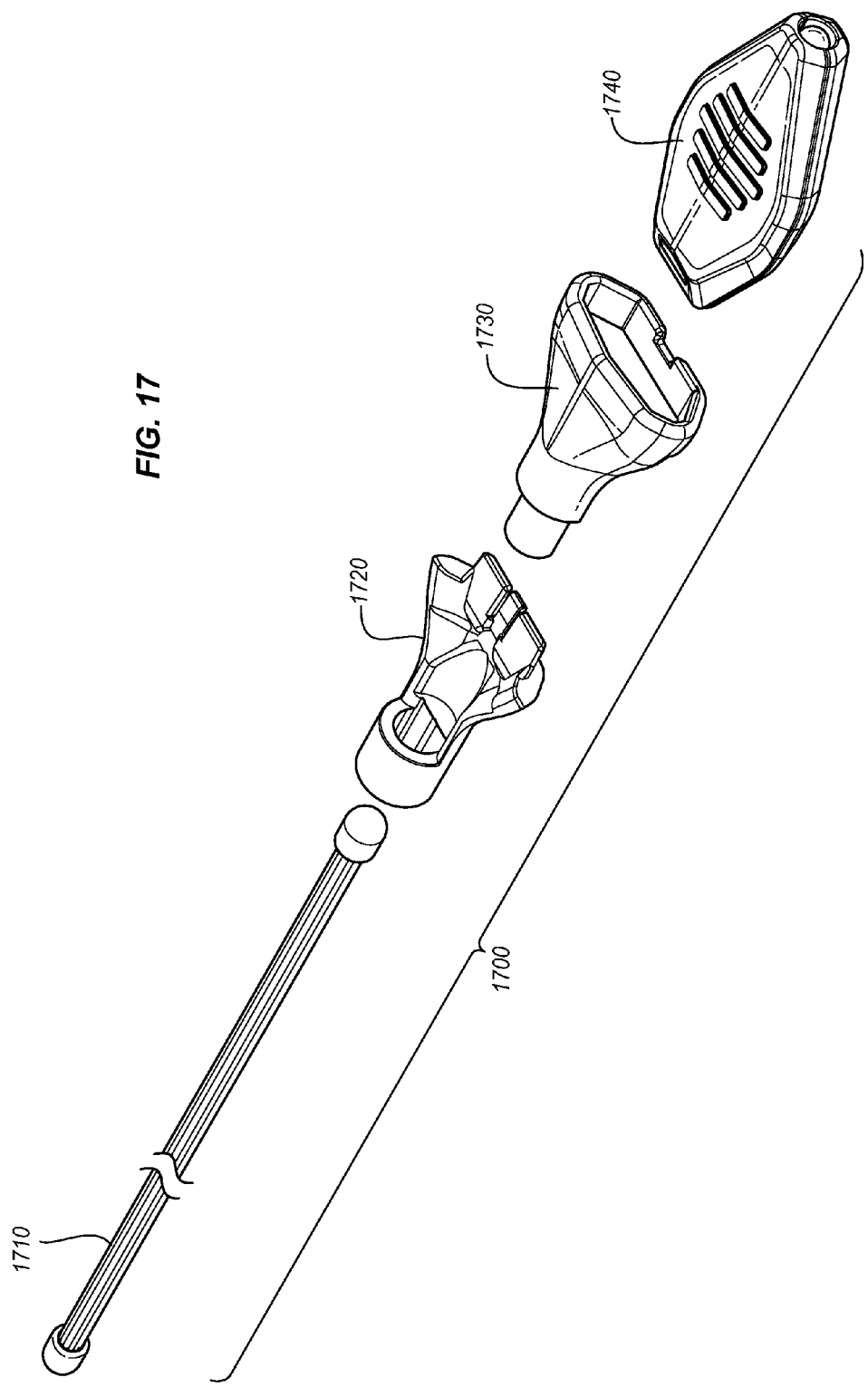
FIG. 17 shows a top perspective view of one embodiment of a lighting device.

FIG. 17 shows a top perspective view of one embodiment of a lighting device 1700. This lighting device provides for a microlight 1740 to be removable attached to a twist tie 1710 similar to as in FIG. 14. Lighting device 1700 includes a first attachment piece 1720 and a second attachment piece 1730.

Figure 18A:
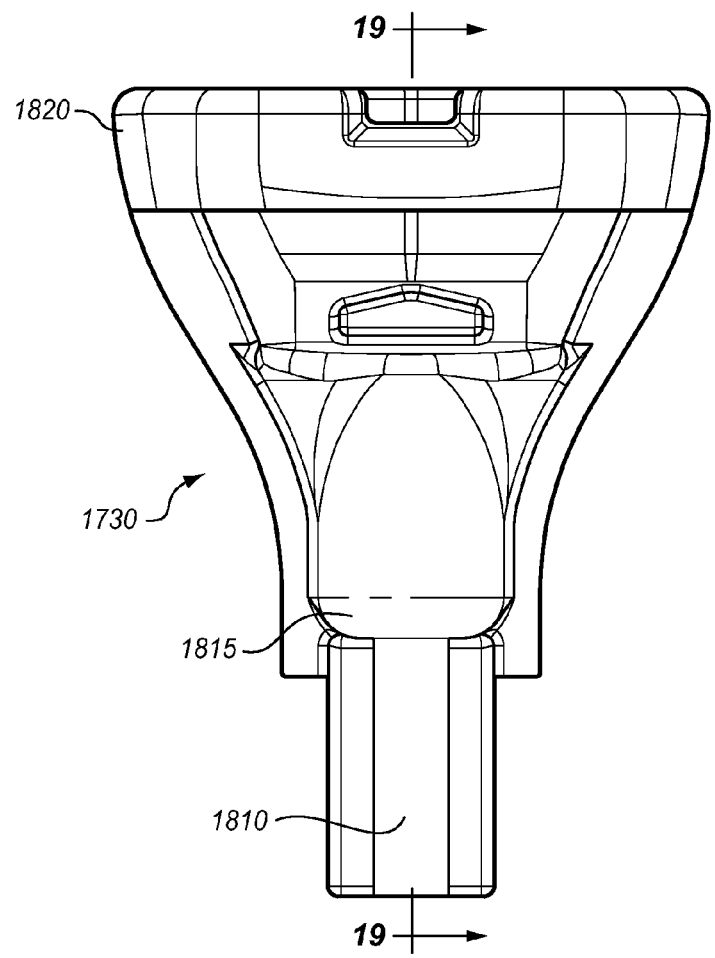
FIG. 18A shows a side view of one-half of a connection device of the lighting device of FIG. 17.
Figure 18B:
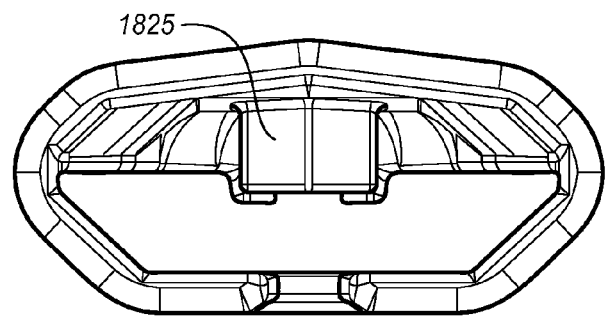
FIG. 18B shows a front view of one-half of the connection device of the lighting device of FIG. 17.

FIG. 18A shows a side view of one-half of a connection device of the lighting device of FIG. 17, and FIG. 18B shows a front view of one-half of the connection device of the lighting device of FIG. 17. Second attachment piece 1730 is typically made of molded plastic; however, other materials such as metal may be used. Second attachment piece 1730 includes an open end 1820 for receiving microlight 1740. Slot 1810 is sized to match the radius of twist tie 1710 which has a capped end that approximately fits in slot 1815. When first attachment piece 1720 and second attachment piece 1730 are integrated, the end cap of twist tie 1710 is held in place by narrower slot 1810. Snap insert receiver 1825 provides for the snap fit of microlight 1740.

Figure 19:
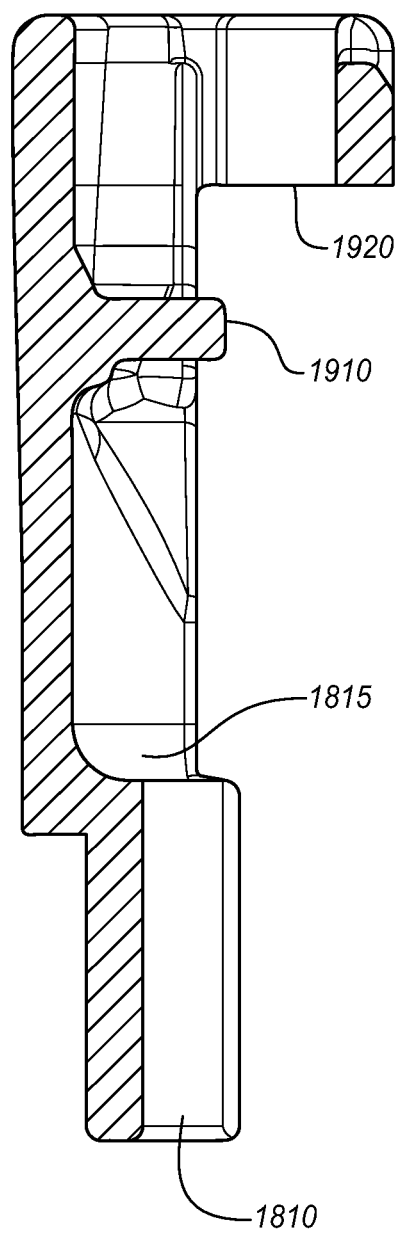
FIG. 19 shows a cross section of one-half of the connection device of the lighting device of FIG. 17.

FIG. 19 shows a cross section of one-half of the connection device of the lighting device of FIG. 17. Here, the opening 1920 for receiving the other half of the connection device is clear. The slot 1815 is shown, defined by ridge 1910 and slot 1810.

Figure 20A:
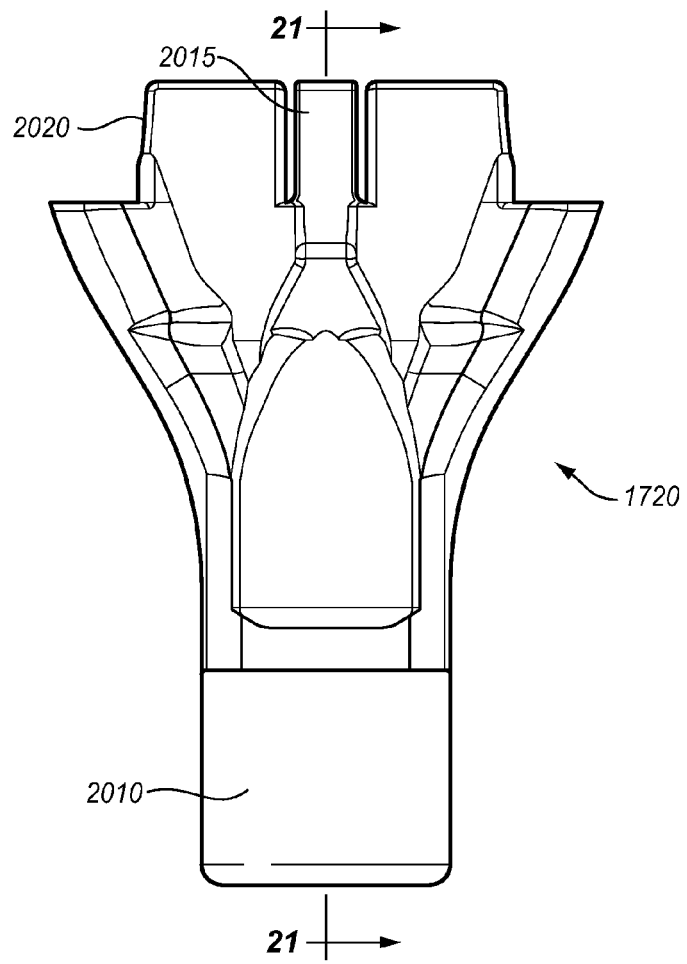
FIG. 20A shows a side view of the other half of a connection device of the lighting device of FIG. 17.
Figure 20B:
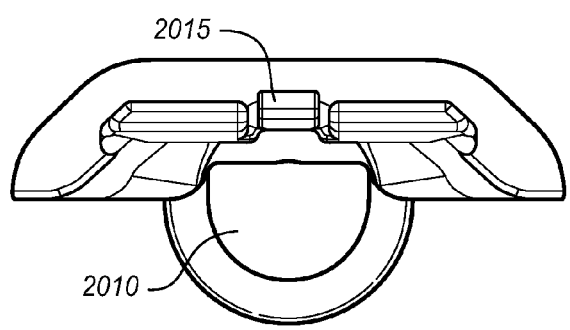
FIG. 20B shows a front view of the other half of the connection device of the lighting device of FIG. 17.
Figure 21:
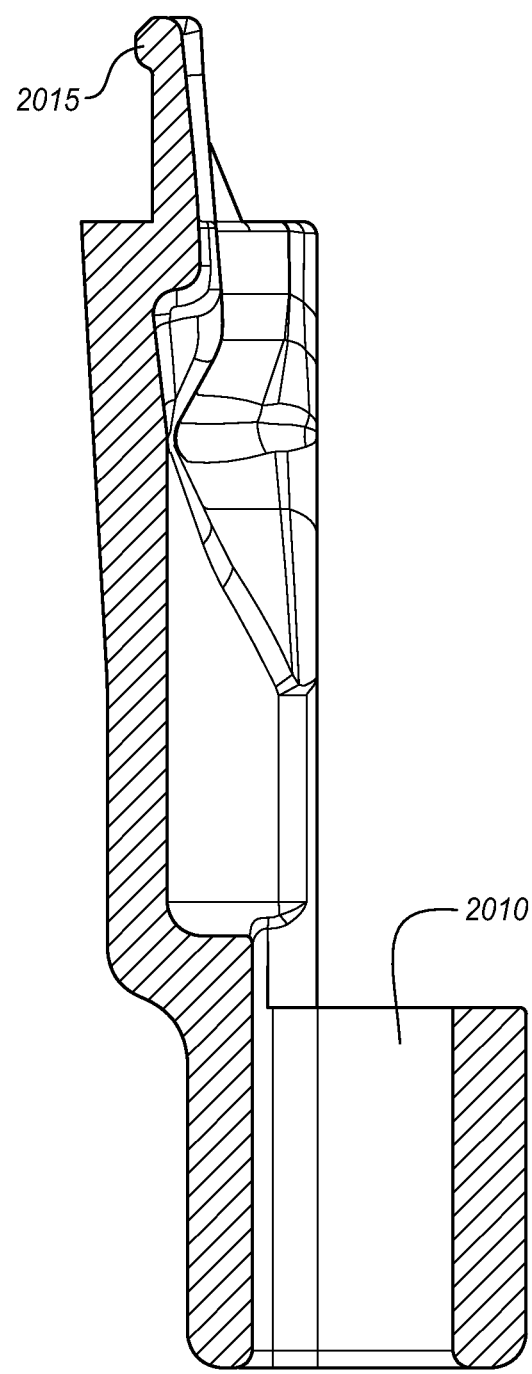
FIG. 21 shows a cross section of the other half of the connection device of the lighting device of FIG. 17.

FIG. 20A shows a side view of the other half 1720 of a connection device of the lighting device of FIG. 17. First attachment 1720 includes a snap fit tab 2015 having a lip that fits into snap insert receiver 1825, which is a slot having a receiver for the tab and the lip such that the tab bends and snaps into place with the lip holding it there. The outer connection portion 2020 provides for a mated fit into the open end 1820. End 2010 is sized to mate with and fit over slot 1810. FIG. 20B shows a front view of the other half of the connection device of the lighting device of FIG. 17. FIG. 21 shows a cross section of the other half of the connection device of the lighting device of FIG. 17. Here the lip on the snap fit tab 2015 is clearly visible.

Figure 22:
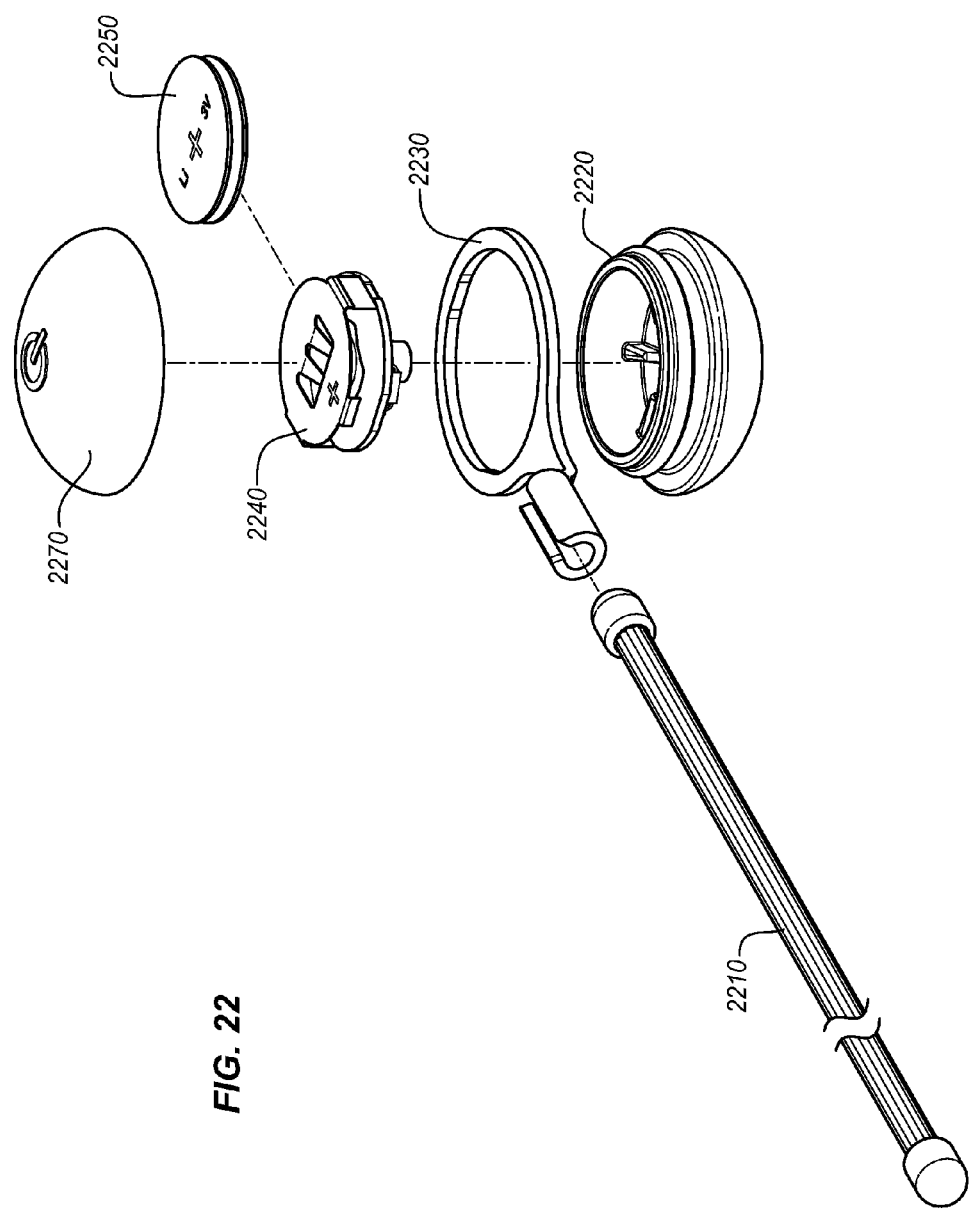
FIG. 22 shows an exploded top perspective view of one embodiment of a lighting device.
Figure 23:
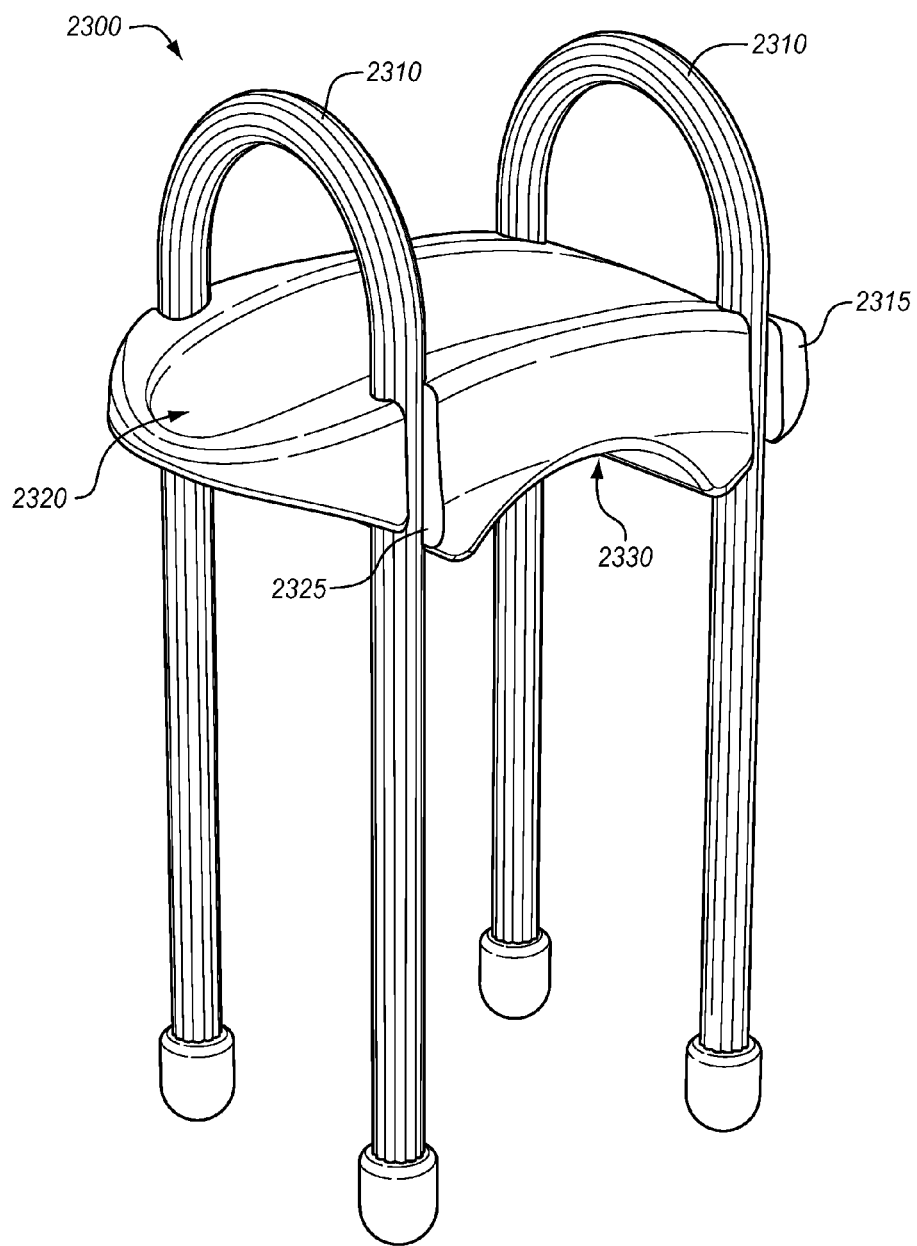
FIGS. 23-26 show an embodiment of an attachment device and the device mounted on handle bars with a flashlight.
Figure 24:
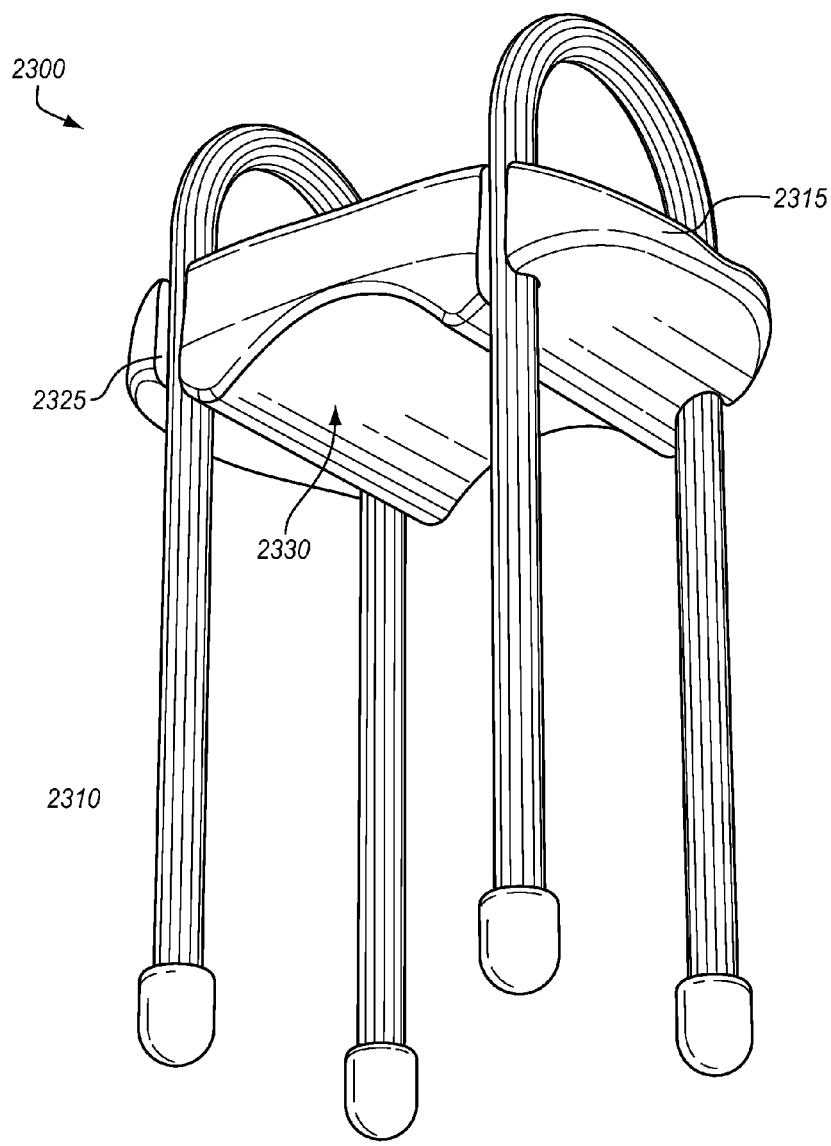

FIG. 22 shows an exploded top perspective view of one embodiment of a lighting device. This lighting device includes a twist tie 2210 as described herein. A connector 2230 having a narrowed end attachment for receiving twist tie 2210 provides for attachment into a lighting mechanism which includes top and bottom cover 2270, 2220, a lighting mechanism, and battery which all fit together. The lighting mechanism described in U.S. Pat. No. 7,683,275 may be used in this configuration and is incorporated by reference herein.

Figure 25:
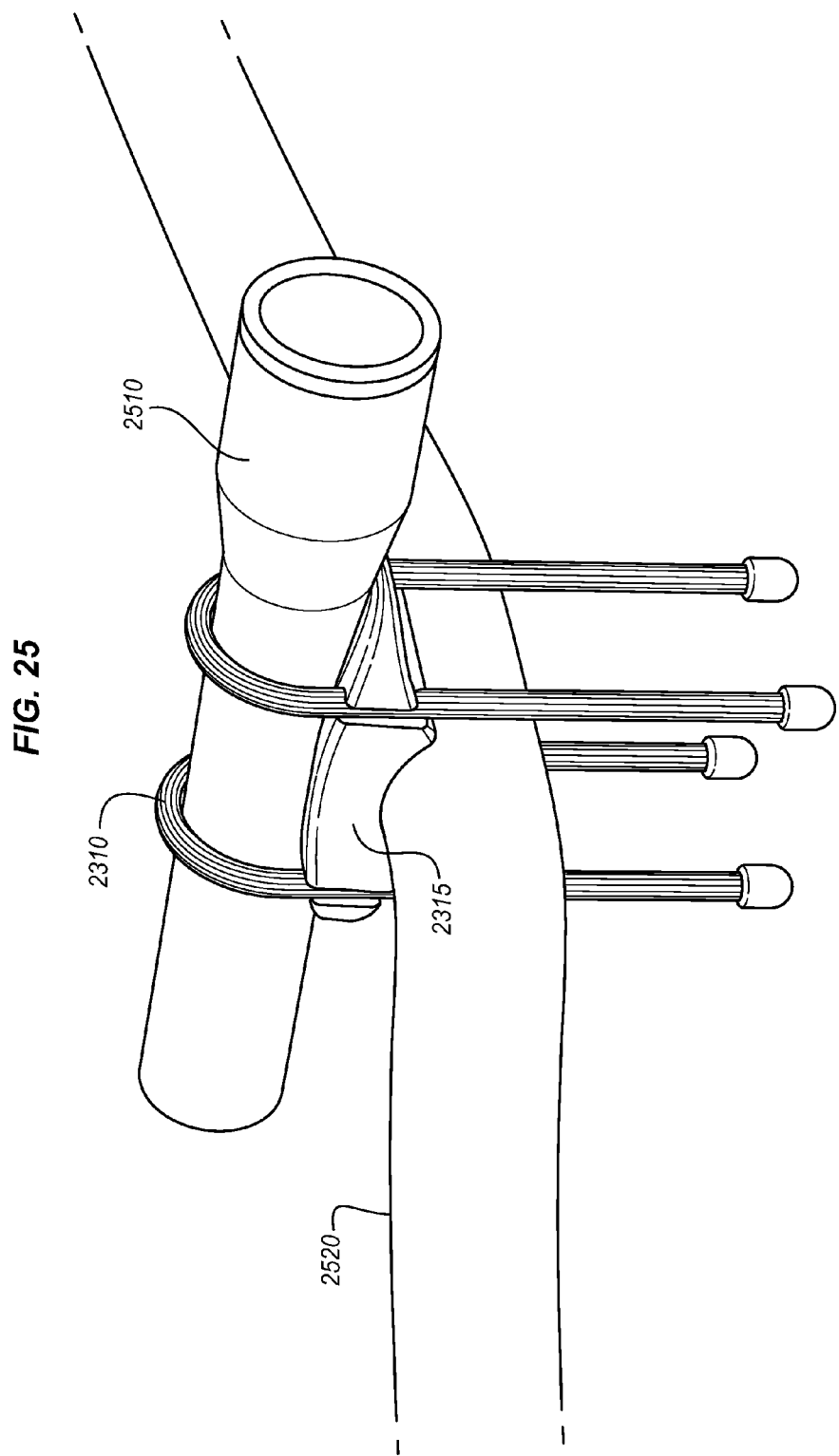
Figure 26:
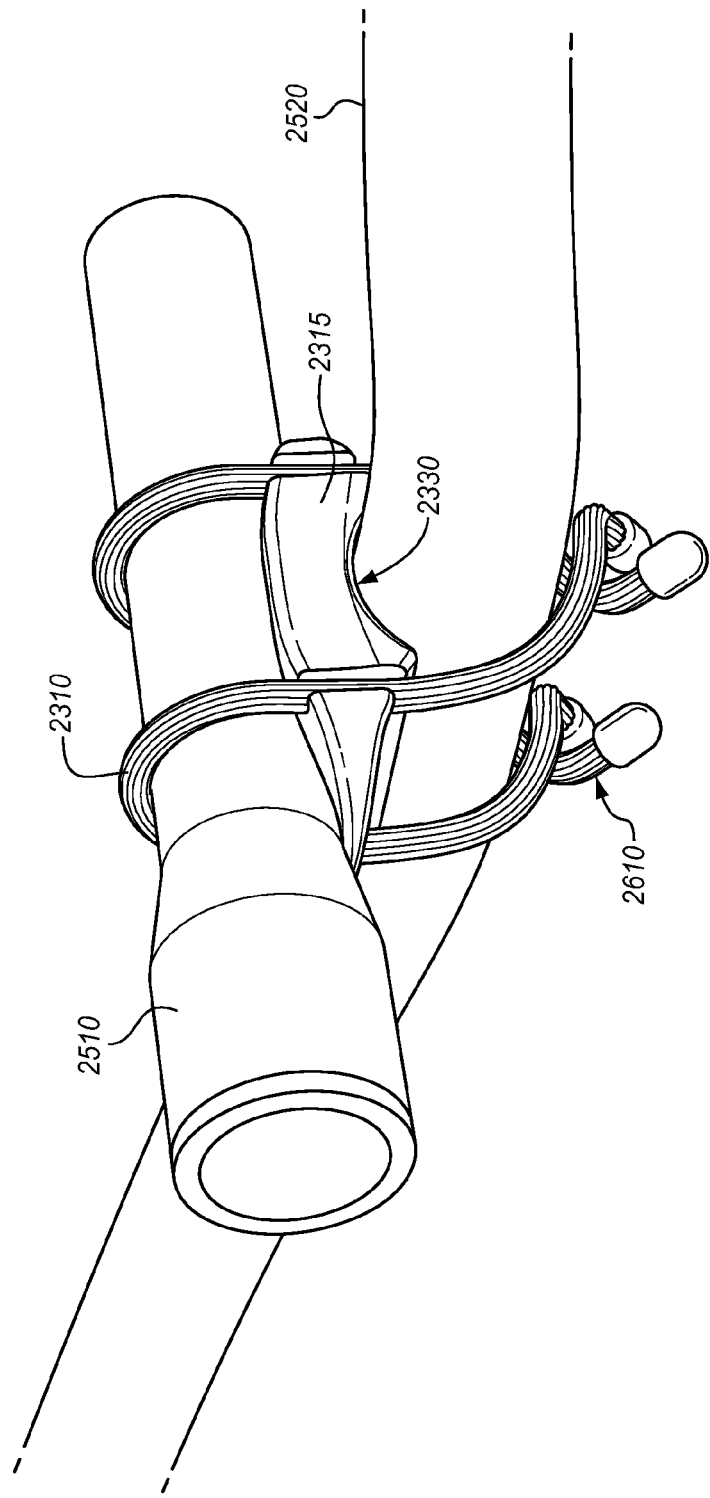

FIGS. 23-26 show an embodiment of a connection device. In this case the connection device 2300 is configured to accept objects with a circular cross section in the top receiver 2320 and the bottom receiver 2330. Although connection device 2300 is adapted to accept such objects, it may be used with items not including a circular cross-section. In one configuration, connection device 2300 is configured to connect to a bicycle hand bars 2520 at receiver 2330 and a flashlight 2510 at receiver 2320, as shown in FIGS. 25-26. FIG. 25 shows the connection device 2300 being placed on the handle bars 2520 for mounting. FIG. 26 shows the ties 2310 being twisted 2610 in order to mount the connection device 2300. The connection device 2300 has significant advantages when combine with the ties described herein, since it can be placed and removed quickly, but still holds its position well in use. As shown, the receivers 2320 and 2330 in body 2315 are curved to fit typically shaped handle bars and flashlights respectively. The body 2315 further includes tie grooves 2325. These grooves are generally shaped and sized such that the ties 2310 may be replaced and removed when pulled through the side openings in the grooves 2325. The grooves 2325 generally hold the ties 2310 unless significant force is applied however. In alternatives, other grooves or simply holes may be used, however, it may be advantageous to be able to replace ties 2310 over a long time period since they may wear. The friction provided by ties 2310, under tension, generally provides for interface resistant to movement under normal riding conditions. This is a result of the material of the ties 2310 including their ridges.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein, but is intended to cover modifications within the spirit and scope thereof as defined by the appended claims and any and all equivalents thereof. Note that, although particular embodiments are shown, features of each attachment may be interchanged between embodiments.

What is claimed as new and desired to be protected by Letters Patent of the United States is:

1. A holder comprising:
 (a) a body, the body having a first and second receiver and a first and second cylindrical holder; and
 (b) a tie comprised of an elongated piece of shape-retaining deformable material and a cover covering said shape-retaining deformable material along a length of said elongated piece; said covering and said shape-retaining deformable material being bonded along their length; a first portion of the tie passing through the first cylindrical holder, a second portion of the tie passing through the second cylindrical holder, such that a loop is formed between the body and the tie, stretching from the first cylindrical holder to the second cylindrical holder, further comprising a second tie, a first portion of the second tie passing through a third cylindrical holder in the body, a second portion of the second tie passing through a fourth cylindrical holder in the body, such that a second loop is formed between the body and the second tie, stretching from the third cylindrical holder to the fourth cylindrical holder.

2. The holder of claim 1 wherein the first and second cylindrical holders each include an aperture along a length of the cylindrical holder with the aperture more narrow than a width of the tie such that, when compressed, the tie is movable through the aperture releasing it from the cylindrical holder.

3. The holder of claim 1 wherein the first receiver is configured to receive a flashlight and the first receiver is located on the body such that it is a portion of the loop formed between the body and the tie.

4. The holder of claim 3 wherein the second receiver is on an opposite side of the body from the first receiver.

5. The holder of claim 4 wherein the second receiver is configured to receive a set of bicycle handle bars.

6. The holder of claim 5 wherein a third and fourth portion of the tie are positioned opposite the loop and are twisted to secure the second receiver to the bicycle handle bars.

7. The connection device of claim 5 wherein a first end and a second end of the first and second ties are twisted to secure the second receiver to the bicycle handle bars.

8. The connection device of claim 7 wherein the first and second ties are comprised of an elongated piece of shape-retaining deformable material and a cover covering the shape-retaining deformable material along the length of the elongated piece; the covering and the shape-retaining deformable material being bonded along their length.

9. A holder comprising:
 (a) a body, the body having a first receiver and a second receiver and a first cylindrical holder and a second cylindrical holder; and
 (b) a tie comprised of an elongated piece of shape-retaining deformable material and a cover covering said shape-retaining deformable material along a length of said elongated piece; said covering and said shape-retaining deformable material being bonded along their length; a first portion of the tie passing through the first cylindrical holder, a second portion of the tie passing through the second cylindrical holder, such that a loop is formed between the body and the tie, stretching from the first cylindrical holder to the second cylindrical holder, wherein the first receiver is configured to receive a flashlight and the first receiver is located on the body such that it is a portion of the loop formed between the body and the tie, the second receiver is on an opposite side of the body from the first receiver, the second receiver is configured to receive a set of bicycle handle bars, a third portion of the tie and a fourth portion of the tie are positioned opposite the loop and are twisted to secure the second receiver to the bicycle handle bars, and the first and second receivers have a shape approximately resembling a horizontal cylinder segment, wherein "horizontal" refers to a direction of a length of the horizontal cylinder segment.

10. The holder of claim 9 wherein the horizontal cylinder segment of the first receiver is perpendicular to the horizontal cylinder segment of the second receiver.

11. The holder of claim 10 wherein the covering of the tie provides for sufficient friction to effectively hold the holder to the bicycle handle bars and a flashlight during normal usage.

12. A connection device for connecting a flashlight to another object, the connection device comprising:
 a body having a first and second receiver and a first, second, third, and fourth aperture located in the body; and
 a first and second tie, the first tie passing through the first and second aperture; the second tie passing through the third and fourth aperture such that a first loop is formed on a first side of the body where the first receiver is located, and a second loop is formed on the first side of the body where the first receiver is located; a first and second end of the first tie extends beyond a second side of the body where the second receiver is located; and a first and second end of the second tie extends beyond the second side of the body where the second receiver is located.

13. The connection device of claim 12 wherein the first and second receiver have a shape approximately resembling a horizontal cylinder segment, wherein "horizontal: refers to a direction of a length of the horizontal cylinder segment.

14. The connection device of claim 13 wherein the horizontal cylinder segment of the first receiver is perpendicular to the horizontal cylinder segment of the second receiver.

15. The connection device of claim 14 wherein the first receiver is configured to receive a flashlight and the second receiver is configured to receive a set of bicycle handle bars.

\* \* \* \* \*